US012690073B2

(12) United States Patent
Chughtai et al.

(10) Patent No.: US 12,690,073 B2
(45) Date of Patent: Jul. 21, 2026

---

(54) METHODS AND SYSTEMS OF SENDING AND RECEIVING MESSAGES BETWEEN A CELLULAR ROUTER AND A SERVER

(71) Applicant: Pismo Labs Technology Limited, Kowloon (HK)

(72) Inventors: Uzair Ahmed Chughtai, Kowloon (HK); Fawad Ahmed, Karachi (PK); Tomas Šeirys, Kaunas (LT); Man Kit Kwan, New Territories (HK); Al-Amin Quyyum, Dacca (BD); Yu Yeung, Kowloon (HK); Ka Ho Ho, Kowloon (HK)

(73) Assignee: Pismo Labs Technology Limited, Kowloon (HK)

( * ) Notice: Subject to any disclaimer, the term of this patent is extended or adjusted under 35 U.S.C. 154(b) by 620 days.

(21) Appl. No.: 17/762,381

(22) PCT Filed: May 28, 2021

(86) PCT No.: PCT/IB2021/054676
§ 371 (c)(1),
(2) Date: Mar. 22, 2022

(87) PCT Pub. No.: WO2022/248923
PCT Pub. Date: Dec. 1, 2022

(65) Prior Publication Data
US 2024/0057176 A1 Feb. 15, 2024

(51) Int. Cl.
*H04W 76/10* (2018.01)
*H04W 48/18* (2009.01)
(Continued)

(52) U.S. Cl.
CPC ........... *H04W 76/10* (2018.02); *H04W 48/18* (2013.01); *H04W 84/042* (2013.01); *H04W 88/06* (2013.01)

(58) Field of Classification Search
CPC ..... H04W 76/10; H04W 48/18; H04W 48/16; H04W 12/06; H04W 88/06; H04W 8/183;
(Continued)

(56) References Cited

U.S. PATENT DOCUMENTS 9,730,106 B2 * 8/2017 Lindoff ............. H04W 28/0846
9,894,601 B2 * 2/2018 Murray ................. H04W 48/16
(Continued)

FOREIGN PATENT DOCUMENTS

CN 110809905 A 2/2020

OTHER PUBLICATIONS

International Search Report in International Application No. PCT/IB2021/054676, mailed on Mar. 2, 2022.
(Continued)

*Primary Examiner* — Yong Hang Jiang
(74) *Attorney, Agent, or Firm* — Hershkovitz & Associates, PLLC; Abe Hershkovitz

(57) ABSTRACT

The present invention discloses methods and systems for using one or more substitute connections between a cellular router and a server. When the server detects that one or more connections fail, the server starts using one or more substitute connections to the one or more failed connections. The connections are used to transmit requests and responses between the cellular router and the server. The requests comprise authentication requests that are transmitted to the server from the cellular router. The responses comprise authentication responses that are transmitted to the cellular router from the server. The authentication requests and the authentication responses are to authenticate one or more SIM cards housed in the server. The cellular router authenticates the one or more SIM cards by utilizing the authen-
(Continued)

tication responses to keep maintaining respective cellular connections established using the one or more SIM cards from the server.

20 Claims, 17 Drawing Sheets

(51) Int. Cl.
 *H04W 84/04* (2009.01)
 *H04W 88/06* (2009.01)
(58) Field of Classification Search
 CPC ......... H04W 4/14; H04W 4/48; H04W 8/205;
 H04W 12/42; H04W 4/24; H04W 4/40;
 H04W 84/12; H04W 88/02; H04W 84/18;
 H04W 12/069
 See application file for complete search history.

(56) References Cited

U.S. PATENT DOCUMENTS

| | | | | |
|---|---|---|---|---|
| 2012/0253847 | A1* | 10/2012 | Dell'Anno | ............ H04L 1/0007 705/2 |
| 2015/0208279 | A1 | 7/2015 | Lindoff | |
| 2016/0094662 | A1* | 3/2016 | Kollu | .................... H04W 48/18 709/224 |
| 2016/0094985 | A1 | 3/2016 | Chong | |
| 2017/0195872 | A1* | 7/2017 | Chong | ................. H04W 8/245 |
| 2017/0302605 | A1 | 10/2017 | Kwan | |
| 2019/0090289 | A1* | 3/2019 | Huang-Fu | ........... H04W 72/044 |
| 2019/0253374 | A1 | 8/2019 | Kwan | |
| 2019/0373444 | A1 | 12/2019 | Chughtai | |
| 2019/0373447 | A1* | 12/2019 | Chughtai | .............. H04W 8/183 |
| 2021/0021983 | A1 | 1/2021 | Chughtai | |
| 2021/0021984 | A1 | 1/2021 | Chughtai | |
| 2021/0021985 | A1 | 1/2021 | Chughtai | |
| 2021/0044960 | A1* | 2/2021 | Bouskila | .............. H04W 76/10 |
| 2021/0219125 | A1 | 7/2021 | Chughtai | |

OTHER PUBLICATIONS

Written Opinion of the International Search Authority in International Application No. PCT/IB2021/054676, mailed on Mar. 2, 2022.
English Language Abstract and the Original Application Document of CN110809905A (Feb. 18, 2020).

* cited by examiner

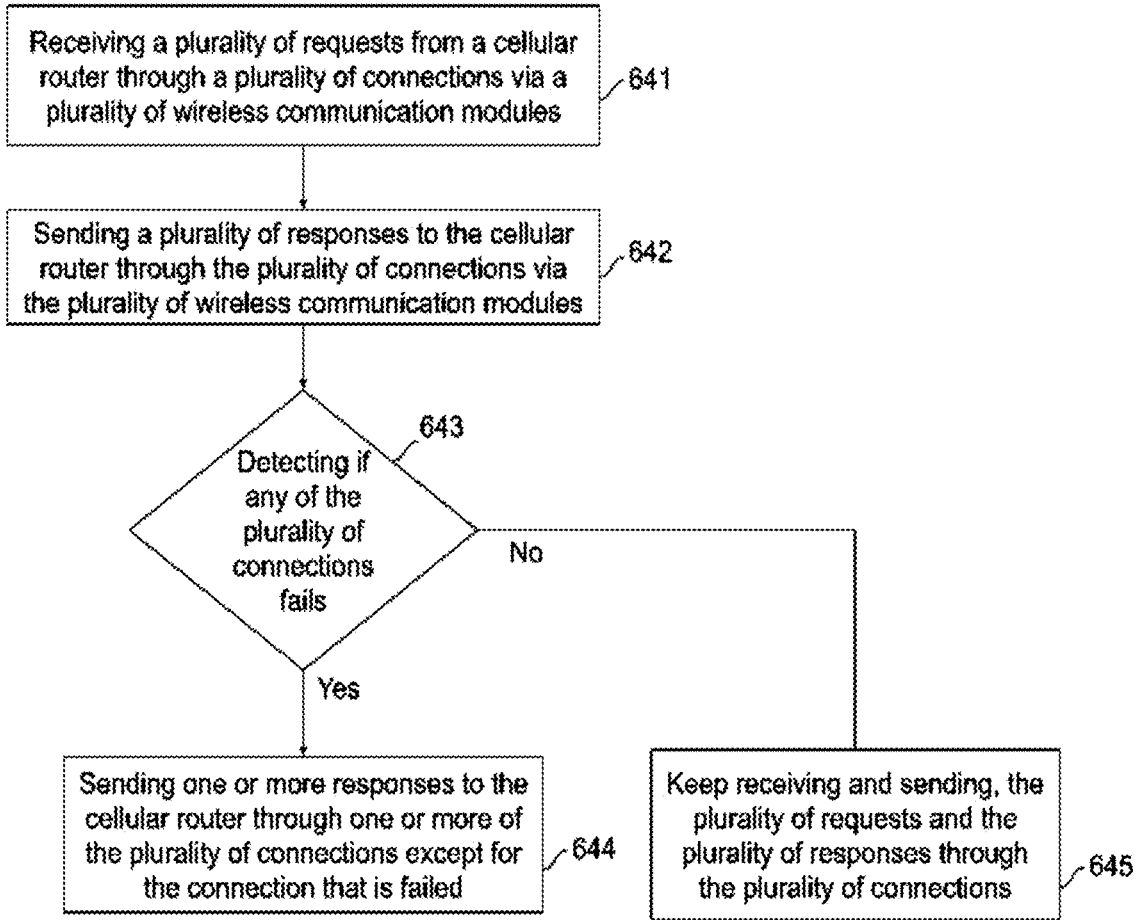

Receiving a plurality of requests from a cellular router through a plurality of connections via a plurality of wireless communication modules ⌐641

Sending a plurality of responses to the cellular router through the plurality of connections via the plurality of wireless communication modules ⌐642

Detecting if any of the plurality of connections fails 643

No

Yes

Sending one or more responses to the cellular router through one or more of the plurality of connections except for the connection that is failed ⌐644

Keep receiving and sending, the plurality of requests and the plurality of responses through the plurality of connections ⌐645

Fig. 6C

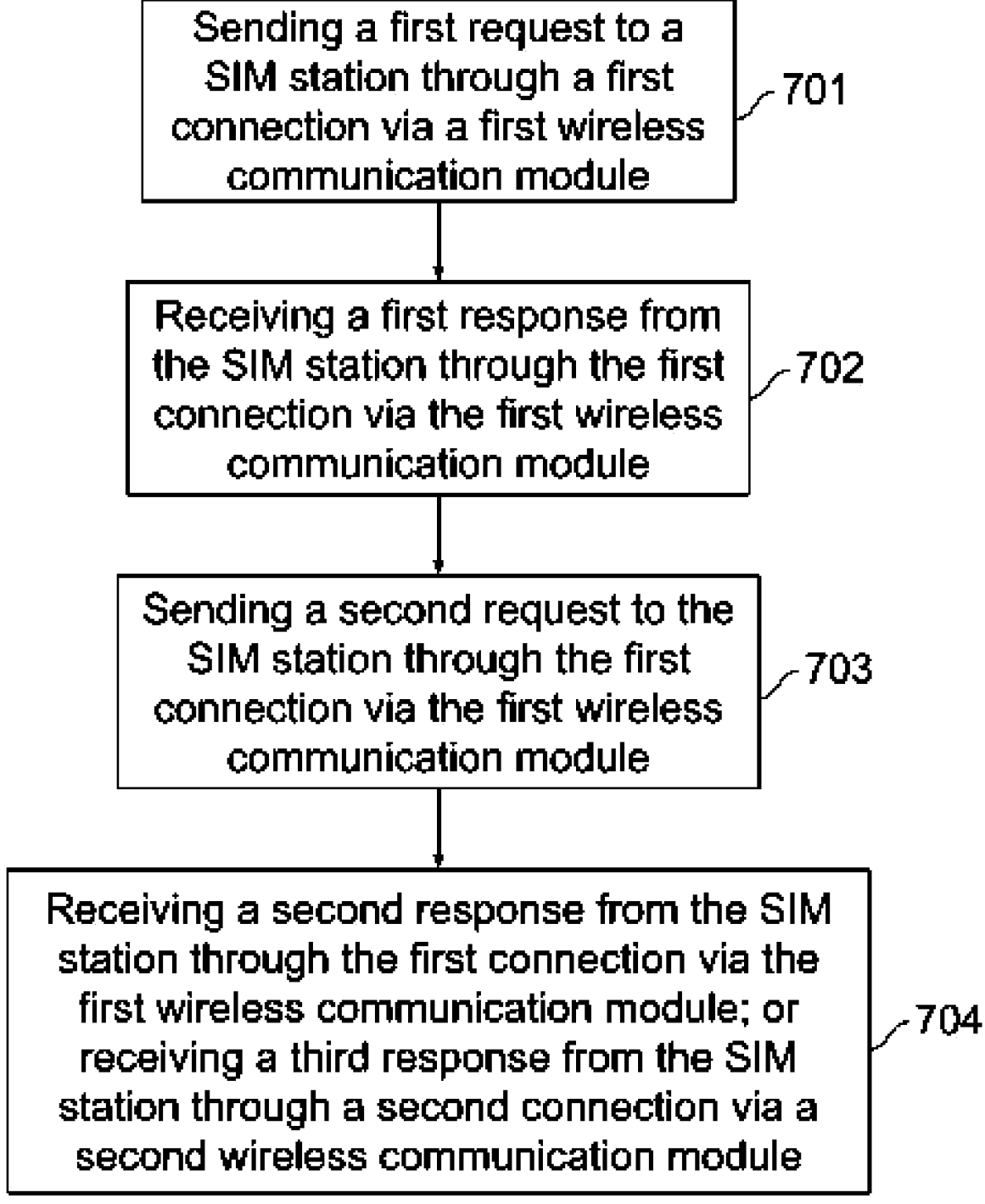

Sending a first request to a SIM station through a first connection via a first wireless communication module ⌐701

Receiving a first response from the SIM station through the first connection via the first wireless communication module ⌐702

Sending a second request to the SIM station through the first connection via the first wireless communication module ⌐703

Receiving a second response from the SIM station through the first connection via the first wireless communication module; or receiving a third response from the SIM station through a second connection via a second wireless communication module ⌐704

Fig. 7A

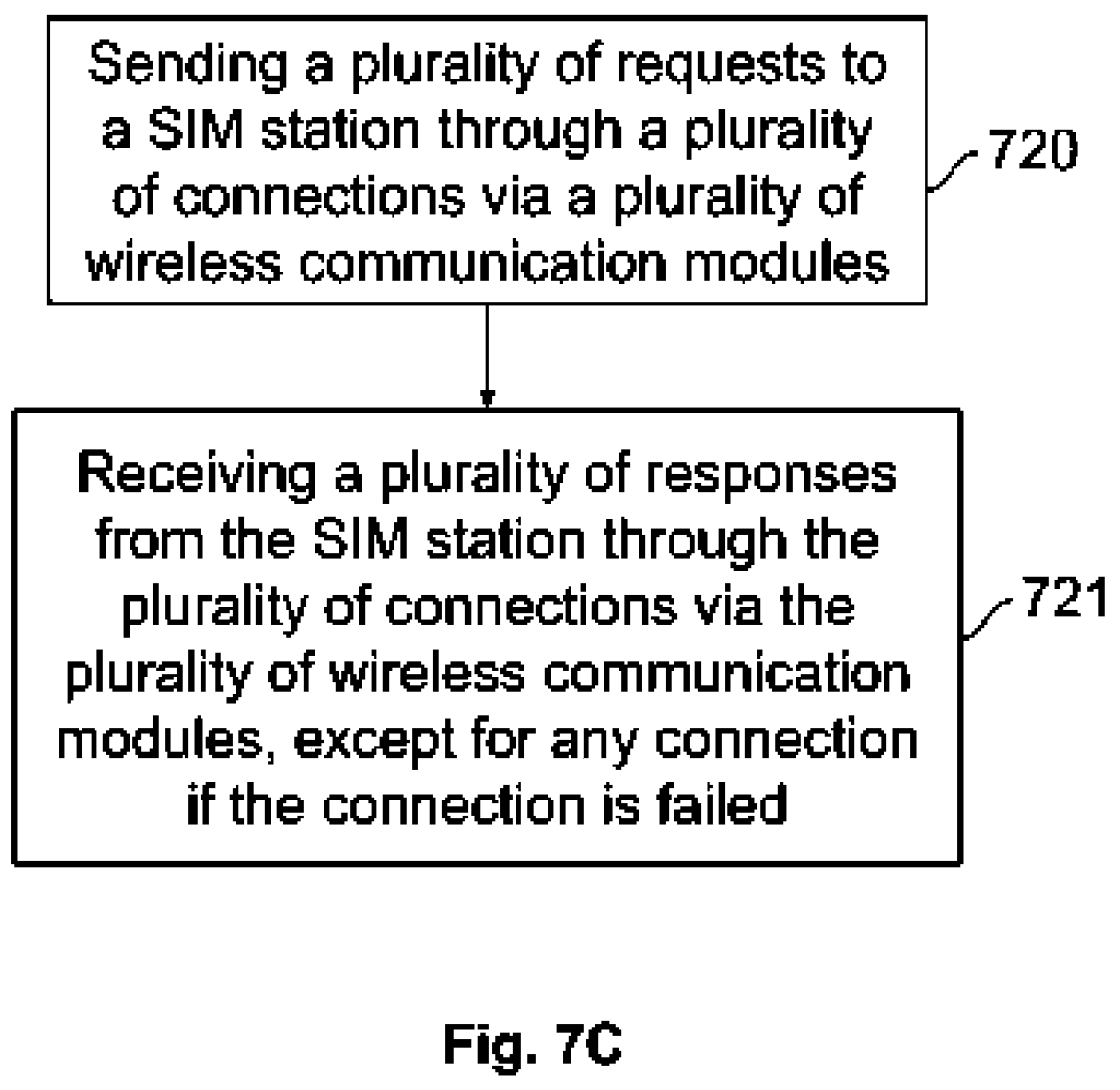

Sending a plurality of requests to a SIM station through a plurality of connections via a plurality of wireless communication modules ⌐720

Receiving a plurality of responses from the SIM station through the plurality of connections via the plurality of wireless communication modules, except for any connection if the connection is failed ⌐721

Fig. 7C

METHODS AND SYSTEMS OF SENDING AND RECEIVING MESSAGES BETWEEN A CELLULAR ROUTER AND A SERVER

TECHNICAL FIELD

The present disclosure relates in general to the field of computer networks, and more particularly, to improved methods and systems to switch a connection to another connection between a cellular router and a subscriber identification module (SIM) station.

BACKGROUND ART

Using a SIM card remotely is a technique where authentication requests and authentication responses should be kept transmitting continuously between two devices. Thus, a networking device, such as a cellular router, maintains a cellular connection established using a SIM card from another device, such as a SIM station, situated remotely from the cellular router. When the cellular router uses multiple SIM cards from the SIM station, it is a complex task to keep transmitting the authentication requests and authentication responses uninterruptedly and unerringly for each of the multiple SIM cards. There may be network problems or other problems to create obstacles for transmitting the authentication requests and authentication responses. The cellular router then fails to maintain the cellular connections established using the multiple SIM cards due to failure of receiving the authentication responses from the SIM station.

SUMMARY OF INVENTION

According to one of the embodiments, the method and system use a second connection established through a second wireless communication module of a cellular router with a SIM station. The cellular router starts to send requests and to receive responses with the SIM station through a first connection using a first wireless communication module of the cellular router. The SIM station then detects if one or more of the responses is stopped to be sent through the first wireless communication module. When the one or more of the responses stop being sent through the first wireless communication module, the SIM station starts to use the second connection with the cellular router through the second wireless communication module of the cellular router. The SIM station then sends the one or more of the responses to the cellular router through the second connection using the second wireless communication module of the cellular router.

The cellular router comprises a plurality of SIM cards to establish a plurality of connections using a plurality of wireless communication modules of the cellular router.

The first wireless communication module and the second wireless communication module are in the plurality of wireless communication modules of the cellular router.

Each of the first connection and the second connection is in the plurality of connections established using a respective SIM card in the plurality of SIM cards.

The SIM station comprises at least one wide area network (WAN) interface to establish the plurality of connections with the cellular router using the plurality of wireless communication modules of the cellular router.

The one or more of the responses is stopped to be sent through the first wireless communication module if a respective SIM card is out of network or the first wireless communication module is broken.

The requests comprise authentication requests to at least one SIM card housed in the SIM station.

The responses comprise authentication responses retrieved from at least one SIM card housed in the SIM station.

After detecting if one or more of the responses is stopped to be sent through the first wireless communication module, the SIM station further waits for a period of time before starting to use the second connection.

The SIM station further starts to receive further requests and to send further responses with the cellular router through the second connection using the second wireless communication module of the cellular router.

BRIEF DESCRIPTION OF DRAWINGS

For a more complete understanding of the present disclosure and its advantages, reference is now made to the following description taken in conjunction with the accompanying drawings, in which like reference numerals represent like parts:

FIG. 6C is a flowchart illustrating processes performed at a SIM station of the present disclosure;

FIG. 7A is a flowchart illustrating processes performed at a cellular router of the present disclosure;

FIG. 7C is a flowchart illustrating processes performed at a cellular router of the present disclosure;

DESCRIPTION OF EMBODIMENTS

Figure 1A:
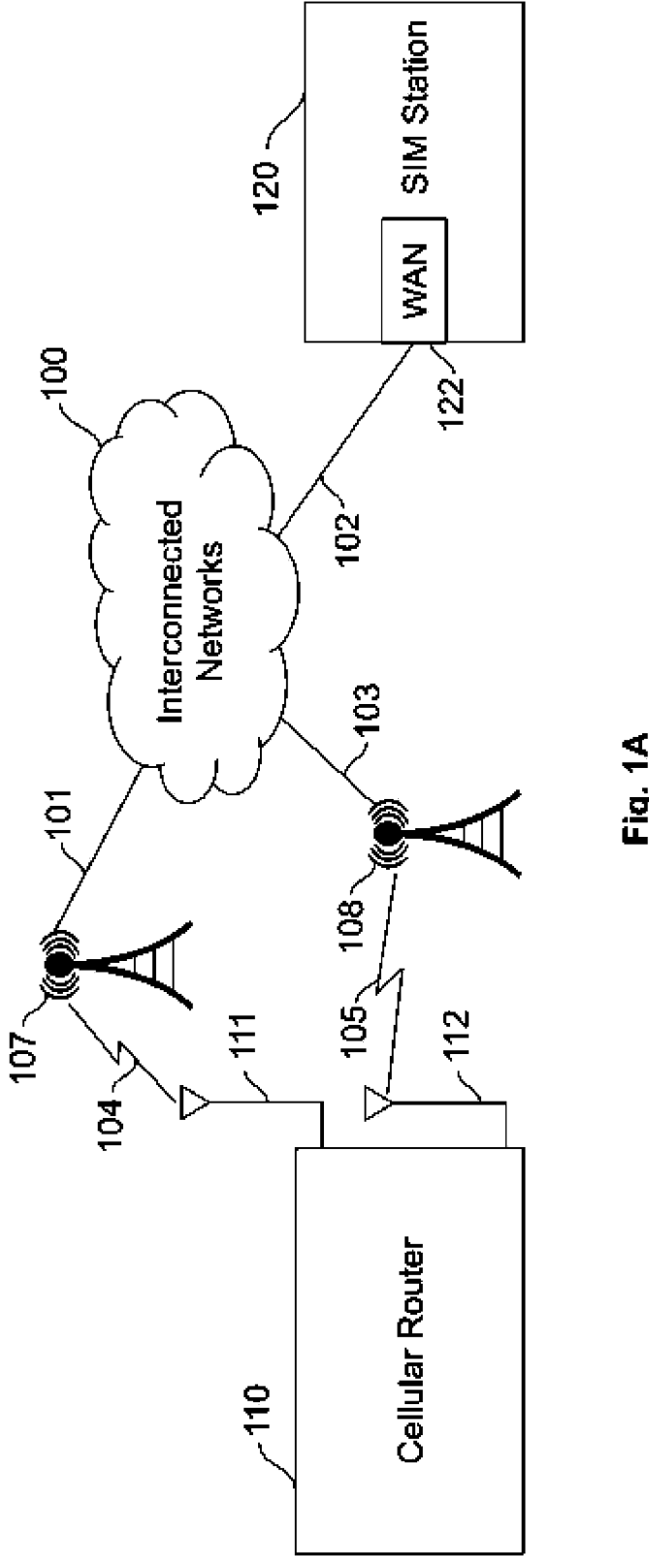
FIG. 1A illustrates a network environment according to various embodiments of the present disclosure.

The ensuing description provides preferred exemplary embodiment only and is not intended to limit the scope, applicability, or configuration of the disclosure. Rather, the ensuing description of the preferred exemplary embodiment will provide those skilled in the art with an enabling description for implementing a preferred exemplary embodiment of the disclosure. It is understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process that is illustrated as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Although the methods and apparatuses have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

Embodiments, or portions thereof, may be embodied in program instructions operable upon a processing unit for performing functions and operations as described herein. The program instructions making up the various embodiments may be stored in a non-transitory storage medium. Moreover, as disclosed herein, the term "non-transitory storage medium" may represent one or more devices for storing data, including read-only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine-readable mediums for storing information. The term "machine-readable medium" includes, but is not limited to, portable or fixed storage devices, optical storage mediums, magnetic mediums, memory chips or cartridges, wireless channels, and various other mediums capable of storing, containing, or carrying instruction and/or data. A machine-readable medium can be realized by virtualization and can be a virtual machine-readable medium, including a virtual machine-readable medium in a cloud-based instance.

The term "non-transitory computer-readable medium", "main memory", or "secondary storage", as used herein, refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to non-volatile media, volatile media, and transmission media. Non-volatile media includes, for example, optical or magnetic disks. Volatile media includes dynamic memory. Transmission media includes coaxial cables, copper wire, and fiber optics. Transmission media can also take the form of acoustic or light waves, such as those generated during radio-wave and infrared data communications.

A volatile storage may be used for storing temporary variables or other intermediate information during the execution of instructions by the processor/processing unit. A non-volatile storage or static storage may be used for storing static information and instructions for processors, as well as various system configuration parameters.

The storage medium may include a number of software modules that may be implemented as software code to be executed by the processing unit using any suitable computer instruction type. The software code may be stored as a series of instructions or commands, or as a program in the storage medium.

Various forms of computer-readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present disclosure. Furthermore, embodiments may be implemented by hardware, software, firmware, middleware, microcode, hardware description languages, or any combination thereof. When implemented in software, firmware, middleware, or microcode, the program instructions to perform the necessary tasks may be stored in a non-transitory computer-readable storage medium. A processing unit can be realized by virtualization and can be a virtual processing unit, including a virtual processing unit in a cloud-based instance.

Embodiments of the present disclosure are related to the use of a computer system for implementing the techniques described herein. In an embodiment, the disclosed processing units may reside on a machine such as a computer platform. According to one embodiment of the disclosure, the techniques described herein are performed by a computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hardwired circuitry may be used in place of or in combination with software instructions to implement the disclosure. Thus, embodiments of the disclosure are not limited to any specific combination of hardware circuitry and software.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means, including memory sharing, message passing, token passing, network transmission, etc.

Alternatively, hardwired circuitry may be used in place of, or in combination with, software instructions to implement processes consistent with the principles of the disclosure. Thus, implementations consistent with the principles of the disclosure are not limited to any specific combination of hardware circuitry and software.

A network interface may be implemented by a standalone electronic component or may be integrated with other electronic components. A network interface may have no network connection or at least one network connection depending on the configuration. A network interface may be an Ethernet interface, a wireless communication interface, a frame relay interface, a fiber optic interface, a cable interface, a Digital Subscriber Line (DSL) interface, a token ring interface, a serial bus interface, a universal serial bus (USB) interface, Firewire interface, Peripheral Component Interconnect (PCI) interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. A wireless access network may be implemented using infrared, High-Speed Packet Access (HSPA), HSPA+, Long Term Evolution (LTE), WiMAX, GPRS, EDGE, GSM, CDMA, Wi-Fi, CDMA2000, WCDMA, TD-SCDMA, BLUETOOTH, WiBro, Evolution-Data Optimized (EV-DO); Digital Enhanced Cordless Telecommunications (DECT); Digital AMPS (IS-136/TDMA); Integrated Digital Enhanced (iDEN) or any other wireless technologies.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, an optical signal, radio frequency or other wireless communication signals, etc. The code segments may, in certain embodiments, be downloaded via computer networks such as the Internet, an intranet, local area network (LAN), metropolitan area network (MAN), wide area network (WAN), the Public Switched Telephone Network (PSTN), a satellite communication system, a cable transmission system, and/or the like.

An information packet is a Protocol Data Unit (PDU) that contains control information, such as address information and user data. An information packet can be a network layer PDU such as Internet Protocol (IPv4 or IPv6), a transport layer PDU such as Transmission Control Protocol (TCP) or User Datagram Protocol (UDP) or PDU of any other protocol that is capable of carrying information over a communication link.

It should be understood that the detailed description and specific examples indicating exemplary embodiments are given for purposes of illustration only and not as limitations. Many changes and modifications may be made without departing from the spirit thereof, and principles of the present disclosure include all such modifications. Corresponding structures, materials, acts, and equivalents of all elements are intended to include any structure, material, or acts for performing the functions in combination with other elements. Reference to an element in the singular is not intended to mean "one and only one" unless explicitly so stated, but rather "one or more." Moreover, when a phrase similar to "at least one of A, B, or C" or "at least one of A, B, and C" is used in the claims or the specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

FIG. 1A illustrates a network environment according to various embodiments of the present disclosure. Cellular router 110 may be a networking device that is used for forwarding IP packets between computer networks. Cellular router 110 may comprise a plurality of SIM cards in order to establish a plurality of cellular connections using respectively a plurality of wireless communication modules. Two wireless communication modules, such as wireless communication modules 111 and 112, are shown in FIG. 1A for illustration purposes. Accordingly, two cellular connections, such as cellular connections 104 and 105, are shown in FIG. 1A for illustration purposes. Cellular connections 104 and 105 are for connecting with base stations, such as base stations 107 and 108, respectively. Cellular router 110 then connects to a network, such as interconnected networks 100 through base stations 107 and 108. Base stations 107 and 108 may be from different or same SIM operators. Therefore, each SIM card in the plurality of SIM cards connects to a corresponding base station according to the SIM operator. Cellular connections 104 and 105 are established using a respective SIM card housed in cellular router 110. Cellular connections 104 and 105 are used to perform IP packet transmission through wireless communication modules 111 and 112, respectively. Cellular router 110 may also comprise a plurality of SIM slots to couple respectively the plurality of SIM cards.

There is no restriction on the number and the type of SIM cards and wireless communications modules in cellular router 110.

Cellular router 110 is configured to use one or more SIM cards housed in SIM station 120 to establish one or more cellular connections. The SIM cards of SIM station 120 may be from different or same SIM operators of SIM cards of cellular router 110.

Each SIM card in the plurality of SIM cards of cellular router 110 and SIM station 120 comprises an International Mobile Subscriber Identities (IMSI). The IMSI comprises a set of wireless network identification values, such as Mobile Country Code (MCC), Mobile Network Code (MNC), and Mobile Subscriber Identification Number (MSIN).

When cellular router 110 uses one or more SIM cards from SIM station 120, cellular router 110 retrieves one or more IMSIs corresponding to one or more SIM cards to establish one or more cellular connections. Cellular router 110 then keeps sending requests to SIM station 120 to keep receiving responses for the one or more SIM cards from SIM station 120. The requests are authentication requests received by cellular router 110 from respective base stations of a corresponding SIM operator. The responses are authentication responses from the one or more SIM cards for forwarding to respective base stations. When cellular router 110 receives the requests from one or more base stations, cellular router 110 forwards the requests to SIM station 120. After receiving the requests from cellular router 110, SIM station 120 retrieves the responses from the one or more SIM cards for forwarding to cellular router 110. When the responses are received from SIM station 120, cellular router 110 then forwards the responses to the one or more base stations. Cellular router 110 then authenticates the one or more SIM cards, and keeps maintaining one or more cellular connections established using the one or more SIM cards from SIM station 120. The requests and the responses are sent and received through one or more IP packets.

Cellular router 110 and SIM station 120 may comprise a plurality of Universal Integrated Circuit Cards (UICCs). UICC is also commonly referred to as SIM cards. Alternatively, UMTS Subscriber Identity Module (USIM), Removable User Identity Module (RUIM), or CDMA Subscriber Identity Module (CSIM) is applicable for the UICC instead of SIM card in the present disclosure. Moreover, cellular router 110 and SIM station 120 may also comprise a plurality of Embedded Universal Integrated Circuit Cards (eUICCs) for storing a plurality of Electronic Subscriber Identification Modules (eSIMs) instead of or in addition with the plurality of UICCs. When eSIMs are used from SIM station 120, cellular router 110 retrieves respective eSIM profiles from SIM station 120. As IMSIs, respective requests and responses should be kept transmitting between cellular router 110 and SIM station 120 for eSIMs to keep maintaining one or more cellular connections established using respective eSIM profiles.

SIM station 120 is an electronic device or a server that comprises a plurality of SIM card slots. The plurality of SIM card slots is configured to couple the plurality of SIM cards, respectively. SIM station 120 further comprises a plurality of WAN interfaces in order to connect with interconnected networks 100. One WAN interface, such as WAN interface 122, is shown in FIG. 1A for illustration purposes. WAN interface may be implemented by using an Ethernet port, an Power over Ethernet (PoE) port, a wireless local area network (WLAN) interface, or other interfaces for connecting to a network. SIM station 120 connects with interconnected networks 100 through a connection, such as connection 102, via WAN interface 122. Connection 102 may be a wireless connection or a wired connection, and established using Ethernet cable, DSL, T1, Wi-Fi, General Packet Radio Service (GPRS), Enhanced Data Rates for GSM Evolution (EDGE), Universal Mobile Telecommunications System (UMTS), Long Term Evolution (LTE), 5G. There is no restriction on the number and on the type of WAN interface in SIM station 120 and connection established through the WAN interface.

Interconnected networks 100 may be any network that allows computing devices or network devices to be connected. Interconnected networks 100 may include, but are not limited to, the Internet and intranet. More than one connection may be established between cellular router 110 and SIM station 120 via interconnected networks 100. For example, two connections may be established between cellular router 110 and SIM station 120 by using wireless communication modules 111 and 112 of cellular router 110, and WAN interface 122 of SIM station 120.

Cellular router 110 may have one or more WAN interfaces (not shown in FIG. 1A) to connect with SIM station 120. The one or more WAN interfaces may be implemented by using an Ethernet port, an Power over Ethernet (PoE) port, a Universal Serial Bus (USB) interface, a Wi-Fi WAN interface, or other interfaces.

Cellular router 110 may use SIM cards housed in both cellular router 110 and SIM station 120 to establish and use cellular connections. It should be noted that cellular router 110 may use at least one SIM card housed in cellular router 110 at the initial phase for establishing at least one connection with SIM station 120 using one or more respective wireless communication modules. Alternatively, cellular router 110 may use at least one WAN interface of cellular router 110 at the initial phase for establishing at least one connection with SIM station 120. Further, cellular router 110 uses SIM cards housed in SIM station 120 to establish more connections with SIM station 120.

Figure 1B:
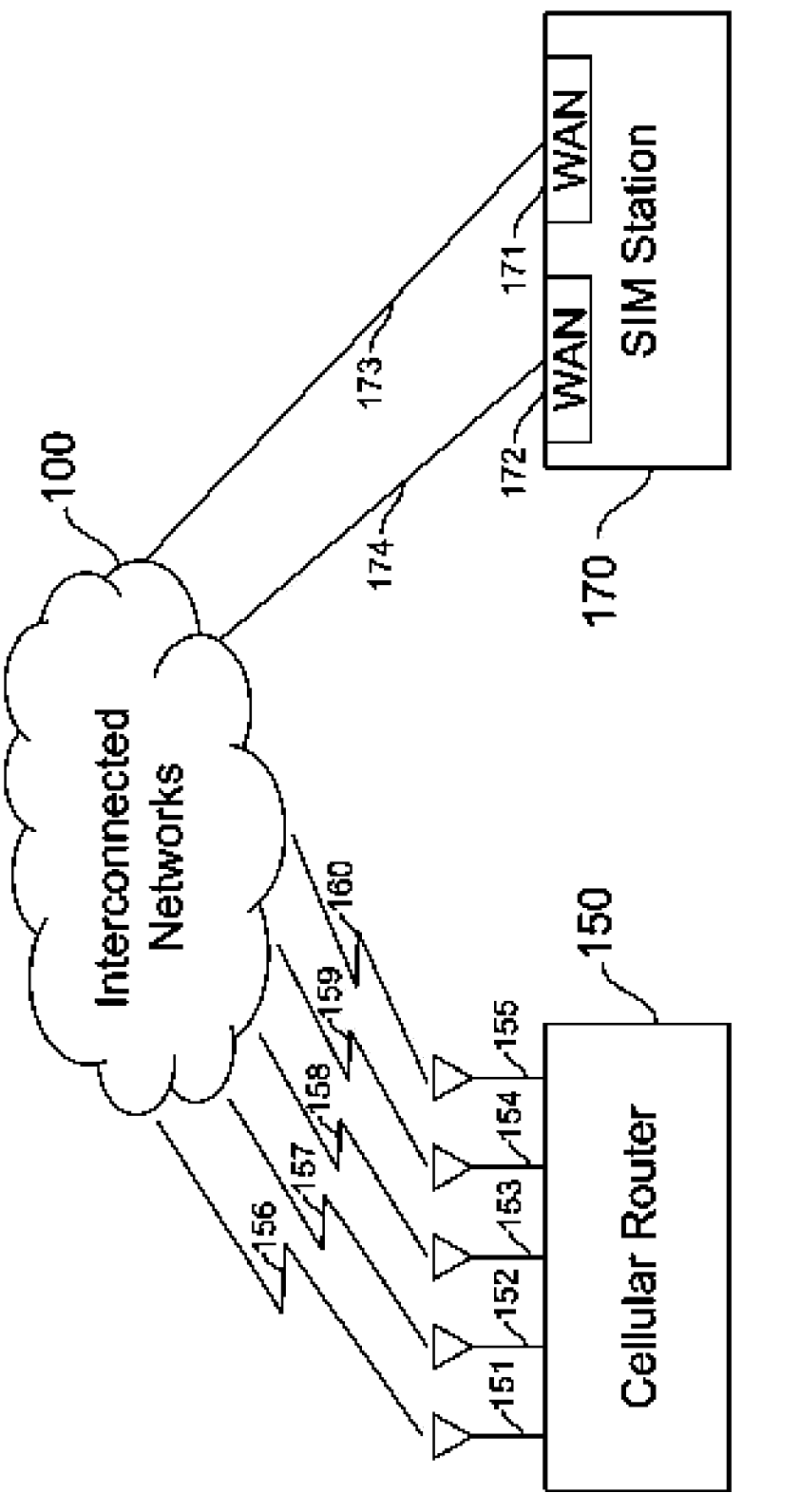
FIG. 1B illustrates a network environment according to various embodiments of the present disclosure.

FIG. 1B illustrates a network environment where cellular router 150 comprises five wireless communication modules, such as wireless communication modules 151, 152, 153, 154, and 155, in comparison to cellular router 110 of FIG. 1A. Therefore, cellular router 150 is configured to connect with interconnected networks 100 through cellular connections 156, 157, 158, 159, and 160, respectively. Further, SIM station 170 comprises two WAN interfaces, such as WAN interfaces 171 and 172, in comparison to SIM station 120 of FIG. 1A. Therefore, SIM station 170 is configured to connect with interconnected networks 100 via a respective connection established using WAN interfaces 171 and 172. A plurality of connections may be established between cellular router 150 and SIM station 170 via interconnected networks 100.

The elements and components, such as SIM card, UICC, USIM, RUIM, CSIM, eUICC, and eSIM, described herein for cellular router 110 and SIM station 120 in FIG. 1A are also applicable for cellular router 150 and SIM station 170. Only the number of wireless communication modules in the cellular router, the number of connections between the cellular router and the SIM station, and the number of WAN interfaces in the SIM station are different from FIG. 1B to FIG. 1A.

Figure 2A:
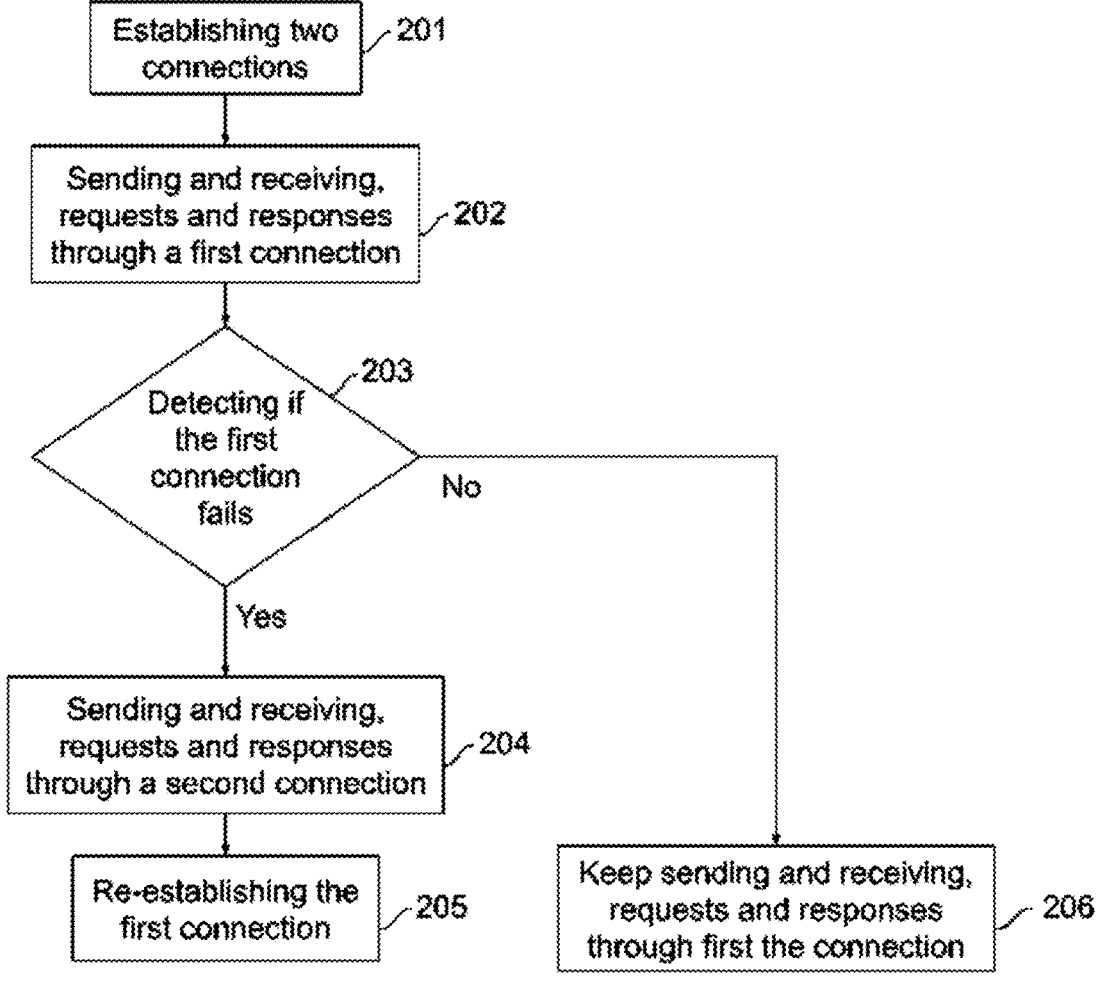
FIG. 2A is a flowchart illustrating processes of one of the embodiments of the present disclosure.

FIG. 2A is a flowchart illustrating a process according to one of the embodiments of the present disclosure. FIG. 2A should be viewed in conjunction with FIGS. 1A and 1B for a better understanding of the embodiments. FIG. 2A illustrates a generic scenario of the present disclosure.

In a network environment, two connections are established between cellular router 110 and SIM station 120. When cellular router 110 uses one or more SIM cards from SIM station 120, cellular router 110 may need to keep sending the requests and receiving the responses with SIM station 120 to maintain one or more cellular connections established using one or more SIM cards from SIM station 120. One of the two connections is used to send and receive requests and responses between cellular router 110 and SIM station 120. When that one connection fails, and stops transmitting the requests and responses, a different connection is used in order to keep sending and receiving the requests and the responses.

In process 201, cellular router 110 establishes two connections through two respective wireless communication modules 111 and 112 with SIM station 120.

In process 202, one of the two connections is used to send and receive the requests and the responses between cellular router 110 and SIM station 120. For example, a first connection of the two connections is used to send and receive the requests and the responses. The requests are the requests received from one or more base stations corresponding to one or more SIM cards housed in SIM station 120. After receiving the requests from one or more base stations, cellular router 110 forwards the requests to SIM station 120 through the first connection. SIM station 120 retrieves the responses from one or more SIM cards to forward to cellular router 110 through the first connection. The first connection is then used to send and receive the requests and the responses between the cellular router 110 and SIM station 120.

In process 203, SIM station 120 detects whether the first connection has failed or not. The first connection may fail due to a broken wireless communication module of cellular router 110, other hardware or software problems of cellular router 110, or other network problems, such as if a respective SIM card is out of order.

If SIM station 120 detects that the first connection has failed in process 203, SIM station 120 sends responses through another connection of the two connections in process 204. For example, another connection is a second connection. When SIM station 120 fails to send one of the responses to cellular router 110 through the first connection, SIM station 120 sends that response through the second connection. Further, cellular router 110 and SIM station 120 use the second connection to send and receive, further requests and further responses.

In one variant, SIM station 120 waits for a period of time before using the second connection. SIM station 120 may wait because the first connection may still be capable of sending the responses. SIM station 120 may send the responses again within the time period through the first connection, which are failed to be sent through the first connection.

It should be noted that a person having ordinary skill in the art would appreciate that if there are Network Address Translators (NATs) placed into interconnected networks 100 between cellular router 110 and SIM station 120, SIM station 120 may not be able to establish any connection. Herein, the well-known technique of Interactive Connectivity Establishment (ICE) may be implemented to allow cellular router 110 and SIM station 120 to connect to each other and establish the first connection. As the ICE is implemented, Session Traversal Utilities for NAT (STUN) and Traversal Using Relay around NAT (TURN) may allow IP packets to be transmitted between cellular router 110 and SIM station 120. Alternatively, the well-known technique of hole punching may be used to establish direct connections between cellular router 110 and SIM station 120 if there are NATs placed into interconnected networks 100. The second connection may also be established using the same technique as the first connection established. The heartbeat packets are kept transmitting through the first connection and the second connection between cellular router 110 and SIM station 120 to maintain both connections. Even if the second connection is not being used, the second connection is still kept maintained. Maintaining the two connections at the same time is advantageous for switching to the second connection without any interruptions to the network performance if the first connection fails.

It should be noted that a person having ordinary skill in the art would appreciate that there are a myriad of ways to detect if any connection has failed. For example, ping and traceroute are tools that may be used to detect if any connection has failed or not. Echo request packets and echo response packets are transmitted through the connections by using ping or traceroute in order to detect if any of the connections has failed. After sending an echo request packet to cellular router 110, if SIM station 120 does not receive any echo response packet, then that connection is detected as failed. In one variant, an echo request packet may include a response. In another variant, a response may include an echo request. In another variant, only the echo request packets are transmitted without the responses when the connection is not in use.

When cellular router 110 sends the requests to SIM station 120 through the first connection, SIM station 120 sends the responses to cellular router 110 through the first connection after receiving the requests. The process of sending the requests and receiving the requests is performed periodically. When one or more of the responses fail to be sent to cellular router 110 by SIM station 120 through the first connection, SIM station 120 detects that the first connection has failed, and starts sending the responses again through the second connection.

In process 205, cellular router 110 and SIM station 120 re-establish the first connection. After re-establishing the first connection, the first connection can be used again if the second connection fails.

If the first connection is not failed in process 203, cellular router 110 and SIM station 120 keep using the first connection to send and receive the requests and the responses in process 206.

In one variant, only one connection, such as the first connection, is established between cellular router 110 and SIM station 120 in process 201. Cellular router 110 then starts sending and receiving requests and responses with SIM station 120 in process 202. The second connection can be established at any stage after beginning the processes of FIG. 2A, but not after the first connection fails. Alternatively, only one different connection, such as the second connection, may be established after the first connection fails.

The methods shown in FIG. 2A are also applicable for cellular router 150 and SIM station 170.

In comparison to FIG. 1A, FIG. 1B illustrates that more than two connections can be established between cellular router 150 and SIM station 170. For example, five connections, such as a first connection, a second connection, a third connection, a fourth connection, and a fifth connection, are established between cellular router 150 and SIM station 170. Cellular router 150 uses one of these five connections, such as the first connection, to send and receive the requests and the responses with SIM station 170. If the first connection fails, and cellular router 150 stops receiving the responses, SIM station 150 sends the responses through one of the second connection, the third connection, the fourth connection, and the fifth connection. For example, SIM station 170 sends the responses through the second connection.

In one variant, SIM station 170 sends the same responses through all of the second connection, the third connection, the fourth connection, and the fifth connection. Cellular router 150 then selects one of these four connections to keep receiving the responses from SIM station 170. For example, cellular router 150 selects the third connection and discards the other responses received through the second connection, the fourth connection, and the fifth connection. Cellular router 150 and SIM station 170 then send and receive, further requests and further responses through the third connection.

Figure 2B:
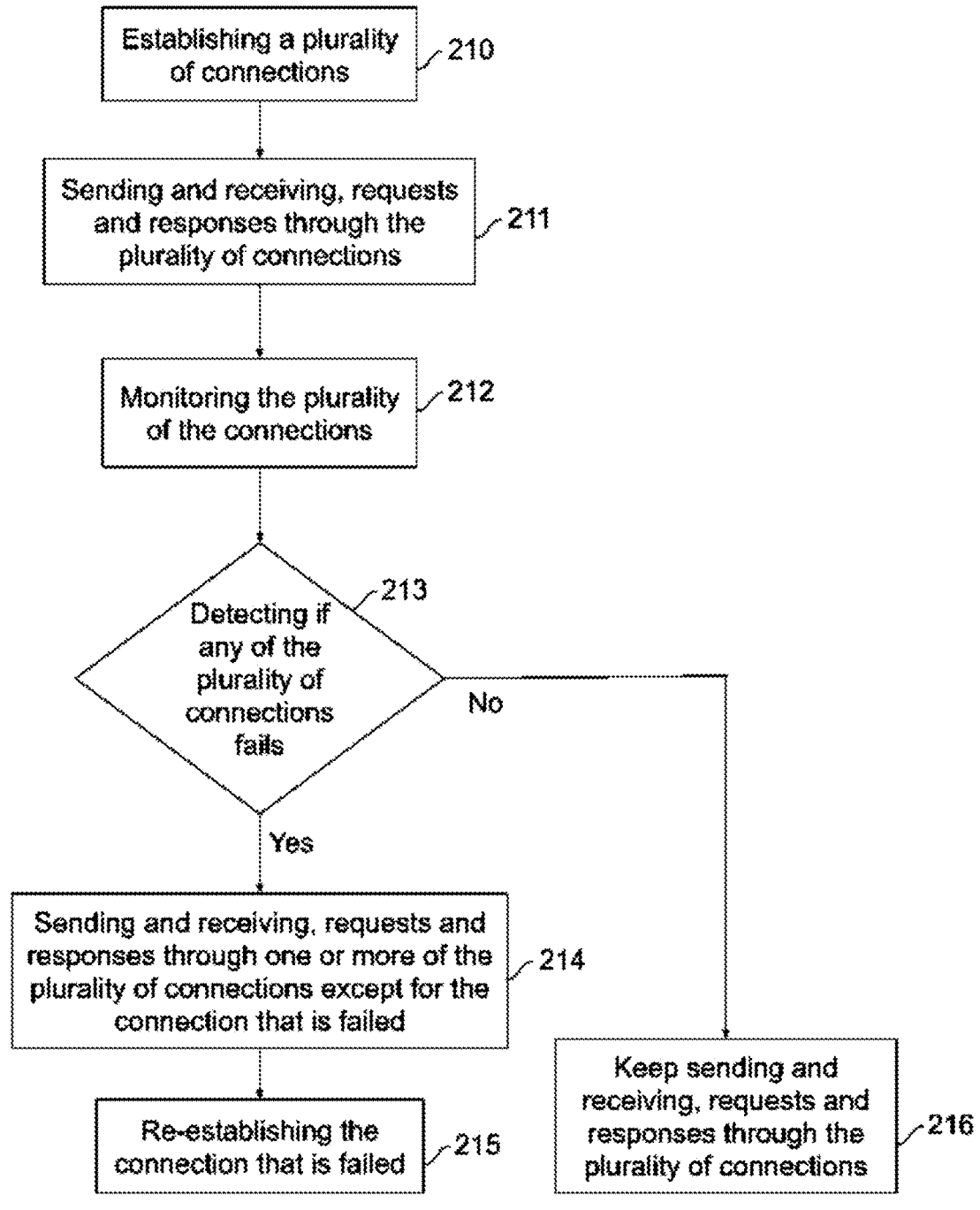
FIG. 2B is a flowchart illustrating processes of one of the embodiments of the present disclosure.

FIG. 2B is a flowchart illustrating a process according to one of the embodiments of the present disclosure. FIG. 2B should be viewed in conjunction with FIG. 1B for a better understanding of the embodiment. FIG. 2B illustrates a different variant of the techniques shown in FIG. 2A when there are more than two connections are established.

In a network environment, a plurality of connections is established between cellular router 150 and SIM station 170 to send and receive requests and responses. For example, five connections are established between cellular router 150 and SIM station 170. These five connections are established using five wireless communication modules, such as wireless communication modules 151, 152, 152, 154, and 155, of cellular router 150. In this scenario, all of the five connections are used to send and receive the requests and the responses. However, these requests and responses are for different SIM cards housed in SIM station 170. Accordingly, cellular router 150 sends particular requests through a particular connection. SIM station 170 then sends responses to the particular requests through that particular connection. If any of the five connections fails and stops transmitting the responses, SIM station 170 uses a different connection from the other four connections to send the responses. In comparison to FIG. 2A, SIM station 170 maintains a wireless communication module identity (ID) if a connection has failed. After failing one of the five connections, SIM station 170 sends the responses, including a wireless communication module ID, through a different connection. The wireless communication module ID is an ID of a wireless communication module that is used for establishing the connection that has failed. Cellular router 150 then identifies for which the responses are intended by using the wireless communication module ID.

In process 210, cellular router 150 establishes a plurality of connections through respective wireless communication modules with SIM station 170. For example, there are five connections, such as a first connection, a second connection, a third connection, a fourth connection, and a fifth connection, established between cellular router 150 and SIM station 170. These five connections are established using respectively wireless communication modules 151, 152, 153, 154, and 155 of cellular router 150.

In process 211, the five connections are used to send and receive the requests and the responses between cellular router 150 and SIM station 170.

In process 212, SIM station 170 monitors the first connection, the second connection, the third connection, the fourth connection, and the fifth connection. In one variant, cellular router 150 monitors these five connections. These five connections are monitored to detect if any of these five connections have failed. These five connections are also monitored to determine the performance of each connection. The performance may be determined based on the bandwidth of a connection. The connection with the highest bandwidth is determined as a connection with the best performance. Alternatively, the performance may be determined based on the latency of a connection. The connection with the lowest latency is determined as a connection with the best performance. It should be noted that a person having ordinary skill in the art would appreciate that there are myriad ways to determine the performance of a connection. Each of the five connections may then be prioritized with the performance. For example, the first connection has the best performance and is prioritized with the first rank. The second connection has comparatively a lower performance than the first connection and is prioritized with the second rank. The third connection, the fourth connection, and the fifth connection have lower performance consistently, and they are prioritized respectively with the third rank, the fourth rank, and the fifth rank.

In one variant, cellular router 150 performs the monitoring of the connections as SIM station 170 described in process 211.

In another variant, none of cellular router 150 and SIM station 170 performs process 212. Process 213 may be performed directly after performing process 211.

In process 213, SIM station 170 detects if any of these five connections have failed. Process 213 is performed following the techniques of process 202 of FIG. 2A.

In process 214, if any of the five connections fails and stops transmitting responses, SIM station 170 starts sending responses through one of the five connections except for the first connection. The one connection should be with the highest rank. For example, the first connection has failed, and SIM station 170 starts sending responses through the second as the second connection is prioritized with the second rank. The responses are sent, including a wireless communication module ID of wireless communication module 151. Cellular router 150 determines the responses that are intended for by taking into account the wireless communication module ID of wireless communication module 151. Cellular router 150 and SIM station 170 then starts sending and receiving, further requests and further responses through the second connection.

In one variant, SIM station 170 does not perform the techniques of process 212. However, cellular router 150 performs the techniques of process 212. SIM station 170 sends the same responses, including the wireless communication module ID of wireless communication module 151 through all of the five connections except for the first connection. Cellular router 150 selects the responses that are only received through the second connection as the second connection is with the highest rank. Cellular router 150 then discards the other responses that are received through the third connection, the fourth connection, the fifth connection. Cellular router 150 and SIM station 170 then starts sending and receiving, further requests and further responses through the second connection.

In another variant, the techniques focused in process 212 are not performed by cellular router 150 and SIM station 170. SIM station 170 sends the responses through more than one of the plurality of connections except for the first connection. Cellular router 150 then selects one of the connections that has transmitted the responses earlier. For example, the second connection is the connection that has transmitted the responses earlier to cellular router 150.

In process 215, cellular router 150 and SIM station 170 re-establish the connection that has failed in process 213. Alternatively, if more than one connection failed, cellular router 150 and SIM station 170 re-establish all of the connections that have failed. After re-establishing any connection, the connection can be used again if any connection fails again.

If none of the five connections failed in process 213, cellular router 150 and SIM station 170 keep using the five connections to send and receive, the requests and the responses in process 216.

The processes described in FIGS. 2A and 2B are the processes performed by the cellular router and the SIM station. Depending on the various conditions and scenarios, the cellular router and the SIM station may have a different number of connections established and are not limited to only the number of connections mentioned herein. The connections established between the cellular router and the SIM station through the interconnected networks may be wired connections or wireless connections. After detecting one or more particular connections failed, one or more connections that are started being used may be one or more substitute, alternative, or replacement connections to that one or more particular connections.

Figure 3A:
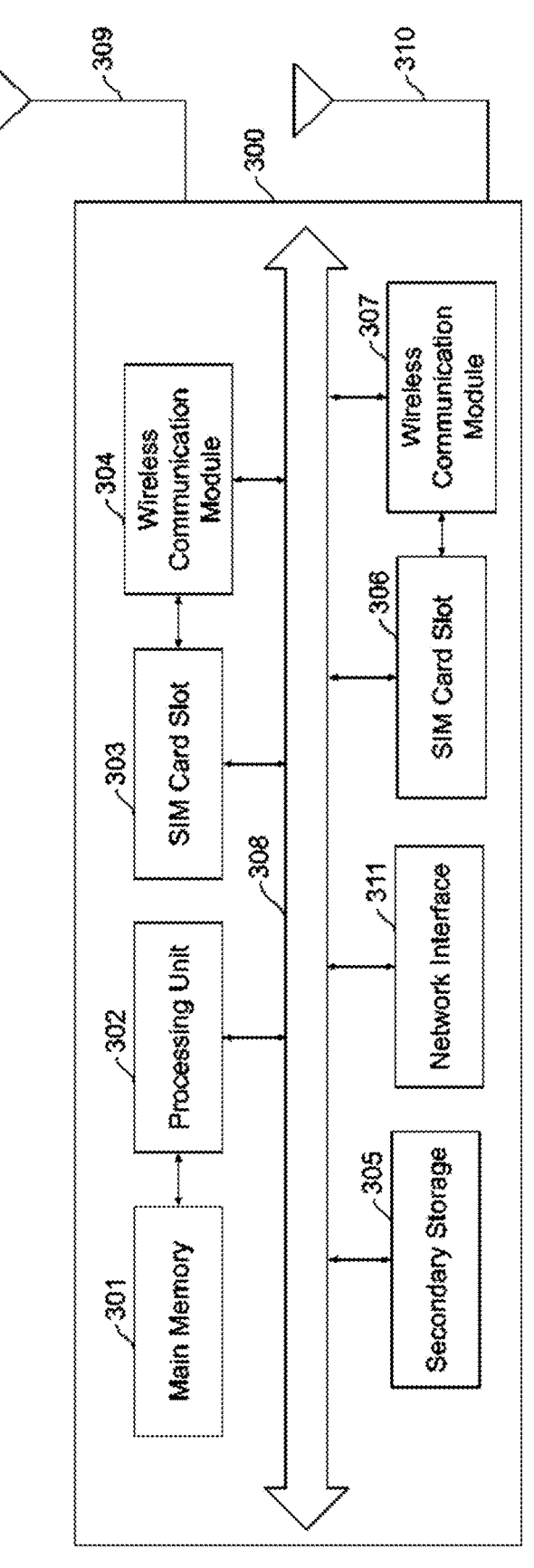
FIG. 3A illustrates a hardware infrastructure of a cellular router.

FIG. 3A illustrates a system, such as system 300, of a hardware infrastructure of cellular router 110.

System 300 comprises a plurality of SIM card slots, such as SIM card slots 303 and 306, wireless communication modules 304 and 307. Each of SIM card slots 303 and 306 are to hold a respective SIM card. SIM card slot 303 is connected to wireless communication module 304 directly. SIM card slot 306 is connected to wireless communication module 307 directly.

System 300 further comprises a plurality of antennas, such as antennas 309 and 310. Antenna 309 is used for wireless communication module 304, and antenna 310 is used for wireless communication module 307 to establish respective cellular connections to connect to interconnected networks 100.

System 300 further comprises processing unit 302, main memory 301, secondary storage 305, and system bus 308. Processing unit 302 is connected to main memory 301 directly. Processing unit 302 further connects to secondary storage 305, SIM card slots 303 and 306, and wireless communication modules 304 and 307 via system bus 308.

System 300 further comprises one or more network interfaces, such as network interface 311, to connect to interconnected networks 100. Network interface 311 may be implemented using an Ethernet port, a PoE port, a WLAN interface, a USB interface, a Wi-Fi WAN interface, a LAN interface, or other interfaces.

There is no restriction on the number and the type of SIM card slots, wireless communications modules, antennas, and network interface in system 300.

System 300 may also be applicable for cellular router 150 of FIG. 1B. System 300 may then have five wireless communication modules as wireless communication modules 304 and 307. The five wireless communication modules then connect to respective five SIM card slots directly and processing unit 302 via system bus 308.

Figure 3B:
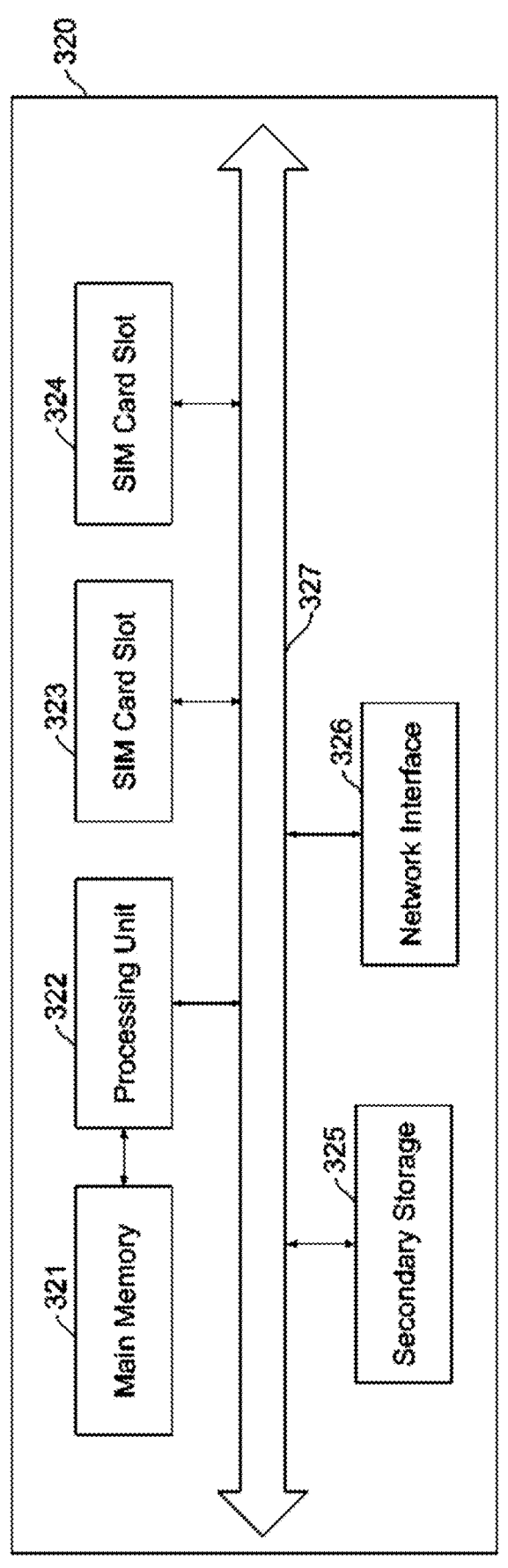
FIG. 3B illustrates a hardware infrastructure of a SIM station.

FIG. 3B illustrates a system, such as system 320, of a hardware infrastructure of SIM station 120.

System 320 comprises a plurality of SIM card slots, such as SIM card slots 323 and 324, to hold a plurality of SIM cards. System 320 further comprises one or more network interfaces, such as network interface 326, to connect to interconnected networks 100. Network interface 100 may be implemented using an Ethernet port, a PoE port, a WLAN interface, a USB interface, a Wi-Fi WAN interface, a LAN interface, or other interfaces for connecting to interconnected networks 100.

System 320 further comprises processing unit 322, main memory 321, secondary storage 325, and system bus 327. Processing unit 322 is connected to main memory 321 directly. Processing unit 322 further connects to network interface 326, secondary storage 325, and SIM card slots 323 and 324 via system bus 327.

There is no restriction on the number and the type of SIM card slots and network interface in system 300.

System 320 may also be applicable for SIM station 170 of FIG. 1B. System 320 may then have two network interfaces as network interface 326. The two network interfaces connect to processing unit 322 via system bus 327.

Figure 4A:
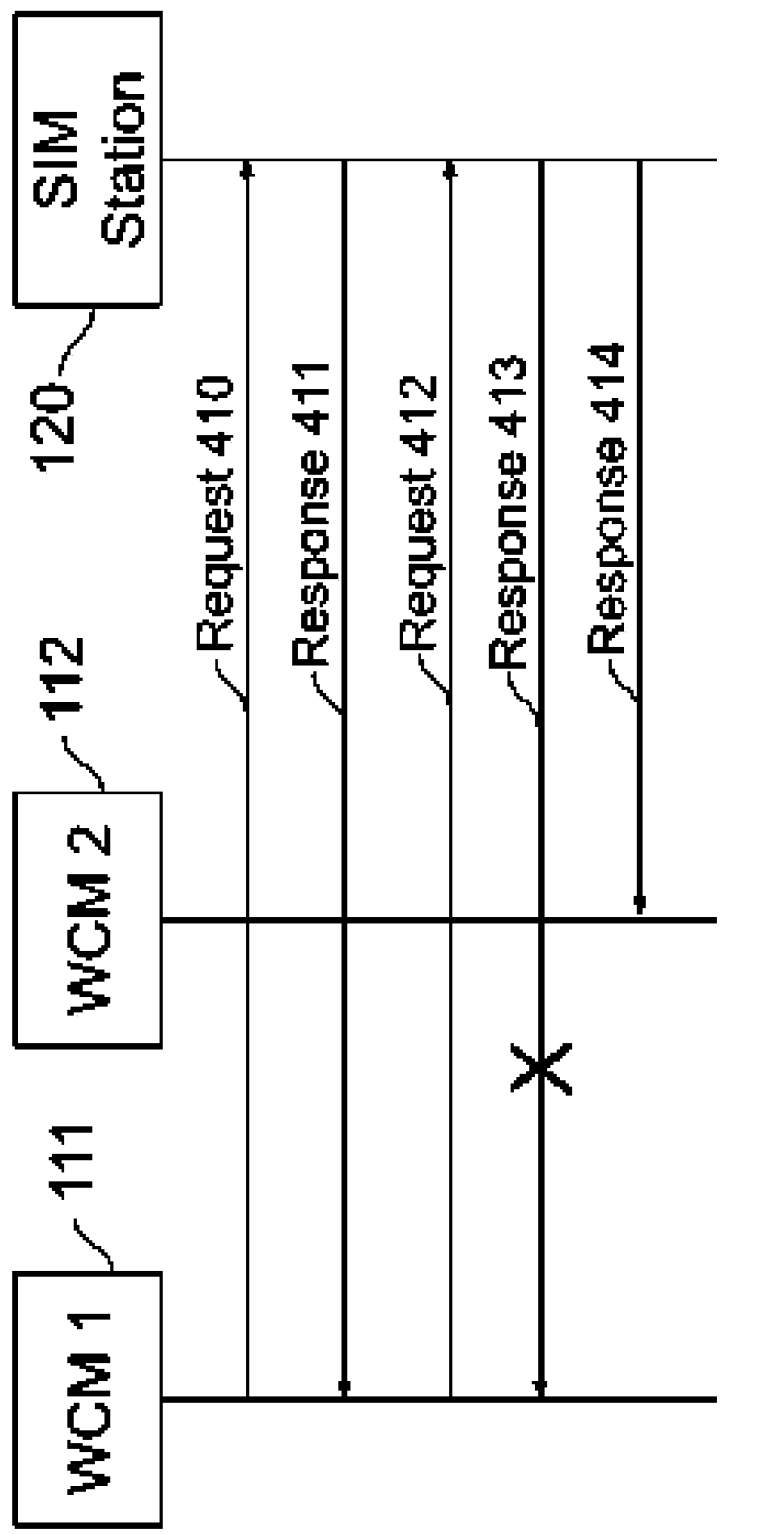
FIG. 4A illustrates how each request is sent, and each response is received through a connection via a communication module of a cellular router.

FIG. 4A is a diagram that illustrates how each request is sent, and each response is received through a first connection via a first communication module of a cellular router. FIG. 4A further illustrates if the first connection fails and stops transmitting the responses, how a SIM station sends the response through a second connection via a second wireless communication module of the cellular router. FIG. 4A should be viewed in conjunction with FIG. 1A and FIG. 2A for a better understanding of the embodiments.

Cellular router 110 sends a first request, such as request 410, to SIM station 120 through a first wireless communication module, such as wireless communication module 111, via the first connection. SIM station 120 sends a first response, such as response 411, through the first connection via wireless communication module 111 to cellular router 110, after receiving request 410. Cellular router 110 further sends a second request, such as request 412, through wireless communication module 111 via the first connection. SIM station 120 then attempts to send a second response, such as response 413, through the first connection via wireless communication module 111 to cellular router 110, after receiving request 412. SIM station 120, however, could not send response 413 through the first connection via wireless communication module 111 to cellular router 110 due to the failure of the first connection. SIM station 120 then creates a third response, such as response 414, to send through a second connection through a second wireless communication module, such as wireless communication module 112. Response 414 created by SIM station 120 contains the contents of response 413, including a wireless communication module ID of wireless communication module 111. After receiving response 414 through wireless communication module 112 via the second connection, cellular router 110 extracts response 414 to identify the wireless communication module ID of wireless communication module 111. Cellular router 110 then detects that response 414 is intended for receiving through wireless communication module 111 via the first connection.

Figure 4B:
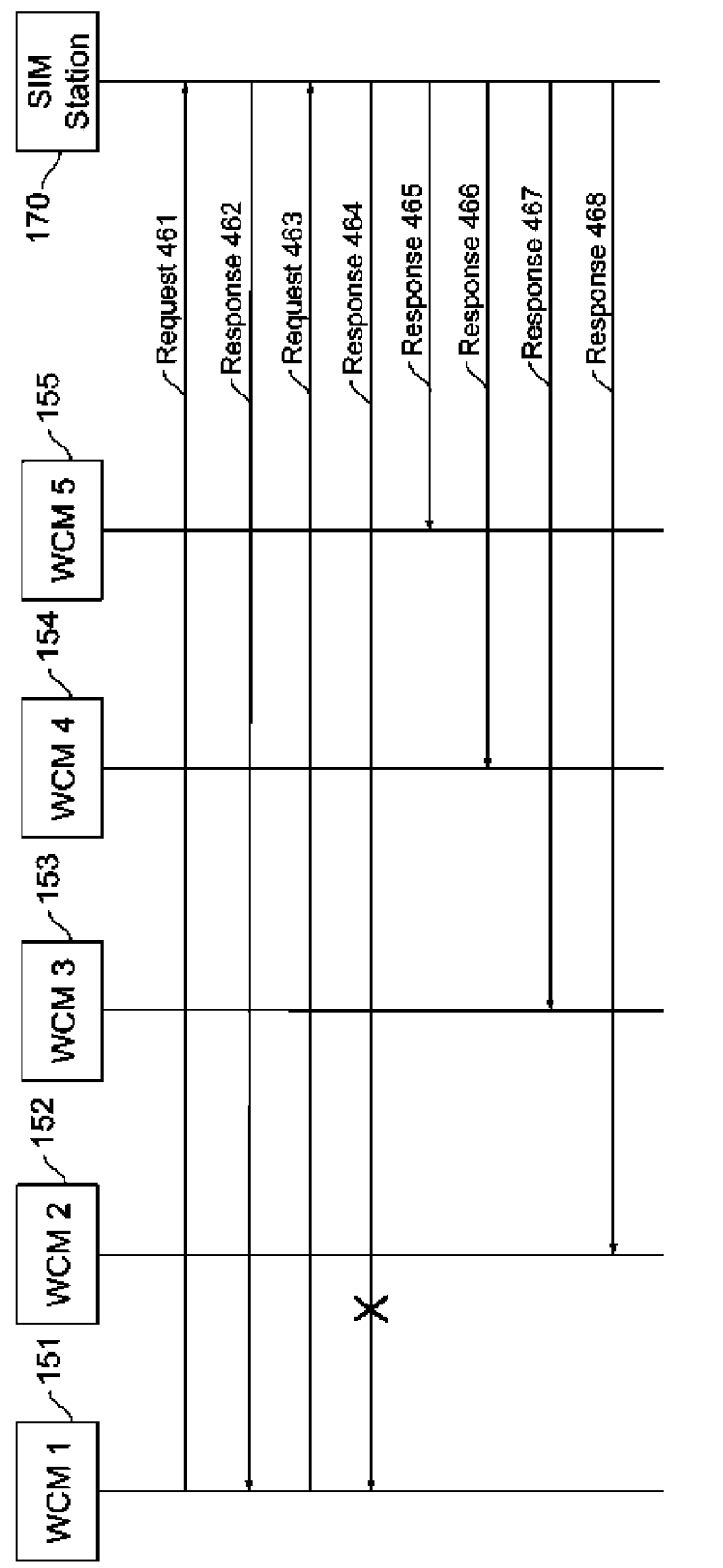
FIG. 4B illustrates how a plurality of requests is sent, and a plurality of responses is received through a plurality of connections via a plurality of wireless communication modules of a cellular router.

FIG. 4B is a diagram that illustrates how a plurality of requests is sent, and a plurality of responses is received through a plurality of connections via a plurality of wireless communication modules of a cellular router. FIG. 4B further illustrates if one of the plurality of connections fails and stops transmitting the responses, how a SIM station sends one or more of the plurality of responses through the other connections of the plurality of connections via a respective wireless communication module of the cellular router. FIG. 4B should be viewed in conjunction with FIG. 1B and FIG. 2B for a better understanding of the embodiments.

Cellular router 150 sends the plurality of requests to SIM station 170 through the plurality of connections via the plurality of wireless communication modules. For example, there are five wireless communication modules 151, 152, 153, 154, and 155 in cellular router 150. Five connections, such as a first connection, a second connection, a third connection, a fourth connection, and a fifth connection, are established using five respective wireless communication modules 151, 152, 153, 154, and 155. Cellular router 150 sends a first request, such as request 461, through the first connection via wireless communication module 151 to SIM station 170. After receiving request 461, SIM station 170 sends a first response, such as response 462, to cellular router 150 through the first connection via wireless communication module 151. Cellular router 150 then sends a second request, such as request 463, through the first connection via wireless communication module 151 to SIM station 170. SIM station 170, however, fails to send a second response, such as response 464, to cellular router 150 due to the failure of the first connection. SIM station 170 then creates four responses, such as response 465, response 466, response 467, and response 468, including the contents of response 464. Each response 465, response 466, response 467, and response 468 further contains a wireless communication module ID of wireless communication module 151. SIM station 170 then sends response 465, response 466, response 467, and response 468 respectively through the fifth connection, the fourth connection, the third connection, and the second connection via respective wireless communication modules, such as wireless communication modules 155, 154, 153, and 152. Cellular router 150 receives one of response 465, response 466, response 467, and response 468 first in sequence from SIM station 170. For example, cellular router 150 receives response 465 first through the fifth connection via wireless communication module 155. Cellular router 150 extracts response 465 to identify the wireless communication module ID of wireless communication module 151. Cellular router 150 then detects that response 465 is intended for receiving through the first connection via wireless communication module 151. Cellular router 150 further selects the fifth connection to use for sending further requests to SIM station 170. Accordingly, SIM station 170 then sends further responses through the fifth connection via wireless communication module 155.

In one variant, SIM station 170 sends only one response through one of the second connection, the third connection, the fourth connection, and the fifth connection. In this variant, SIM station 170 monitors all of the connections and determines the performance of each of the connections following the techniques of process 211. SIM station 170 then sends the response through a connection that has the best performance and ranked highest among the connections except for the first connection. For example, the second connection that is established using wireless communication module 152 has the best performance with the highest rank. SIM station 170 then selects the second connection to send the one response to cellular router 150. For example, the response is response 468 created with the contents of response 464 that includes the wireless communication module ID of wireless communication module 151. Cellular router 150 detects that response 468 is intended for receiving through the first connection via wireless communication module by the wireless communication module ID of wireless communication module 151. Cellular router 150 then sends further requests through the second connection via wireless communication module 152. Accordingly, SIM station 170 sends further responses to cellular router 150 through the second connection via wireless communication module 152.

In another variant, all the connections and the wireless communication modules of cellular router 150 may be used for sending and receiving requests and responses at the same time. In this variant, all the connections and the wireless communication modules are used simultaneously for transmitting their own respective requests and responses, and for transmitting the requests and responses of the failed connection.

In another variant, only one connection and the respective wireless communication module of cellular router 150 is used for sending and receiving the requests and responses. When this one connection fails, and stops transmitting the requests and responses, another connection and a respective wireless communication module are used to send and receive the requests and responses.

Figure 4C:
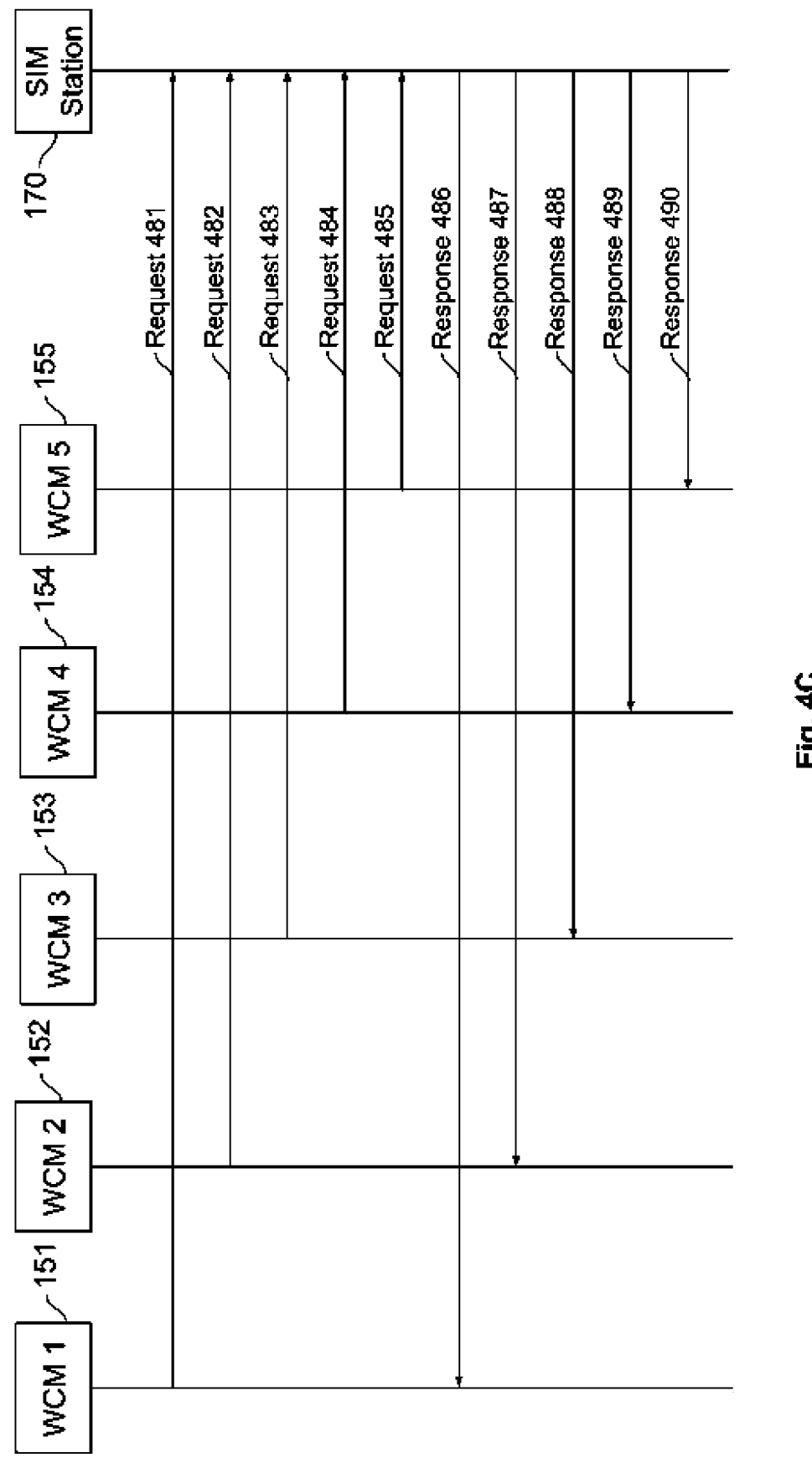
FIG. 4C illustrates how each of a plurality of requests is sent, and each of a plurality of responses is received respectively through each of a plurality of connections via respective wireless communication modules of a cellular router.

FIG. 4C is a diagram that illustrates how each of a plurality of requests is sent and each of a plurality of responses is received respectively through each of a plurality of connections via respective wireless communication modules of a cellular router. FIG. 4C should be viewed in conjunction with FIG. 1B for a better understanding of the embodiments.

Cellular router 150 sends the plurality of requests respectively through the plurality of connections via the respective wireless communication modules. For example, cellular router 150 sends five requests, such as request 481, request 482, request 483, request 484, and request 485, respectively, through a first connection, a second connection, a third connection, a fourth connection, and a fifth connection to SIM station 170. The first connection, the second connection, the third connection, the fourth connection, and the fifth connection are established using five respective wireless communication modules, such as wireless communication modules 151, 152, 153, 154, and 155. After receiving request 481, request 482, request 483, request 484, and request 485, SIM station 170 sends five respective responses, such as response 486, response 487, response 488, response 489, and response 490, through respective connections via respective wireless communication modules.

In one variant, SIM station 150 sends only one response through one of five connections using a respective wireless communication module. This one response contains all the contents of response 486, response 487, response 488, response 489, and response 490 that includes all the corresponding wireless communication modules IDs of wireless communication modules 151, 152, 153, 154, and 155.

Figures 5A, 5B:
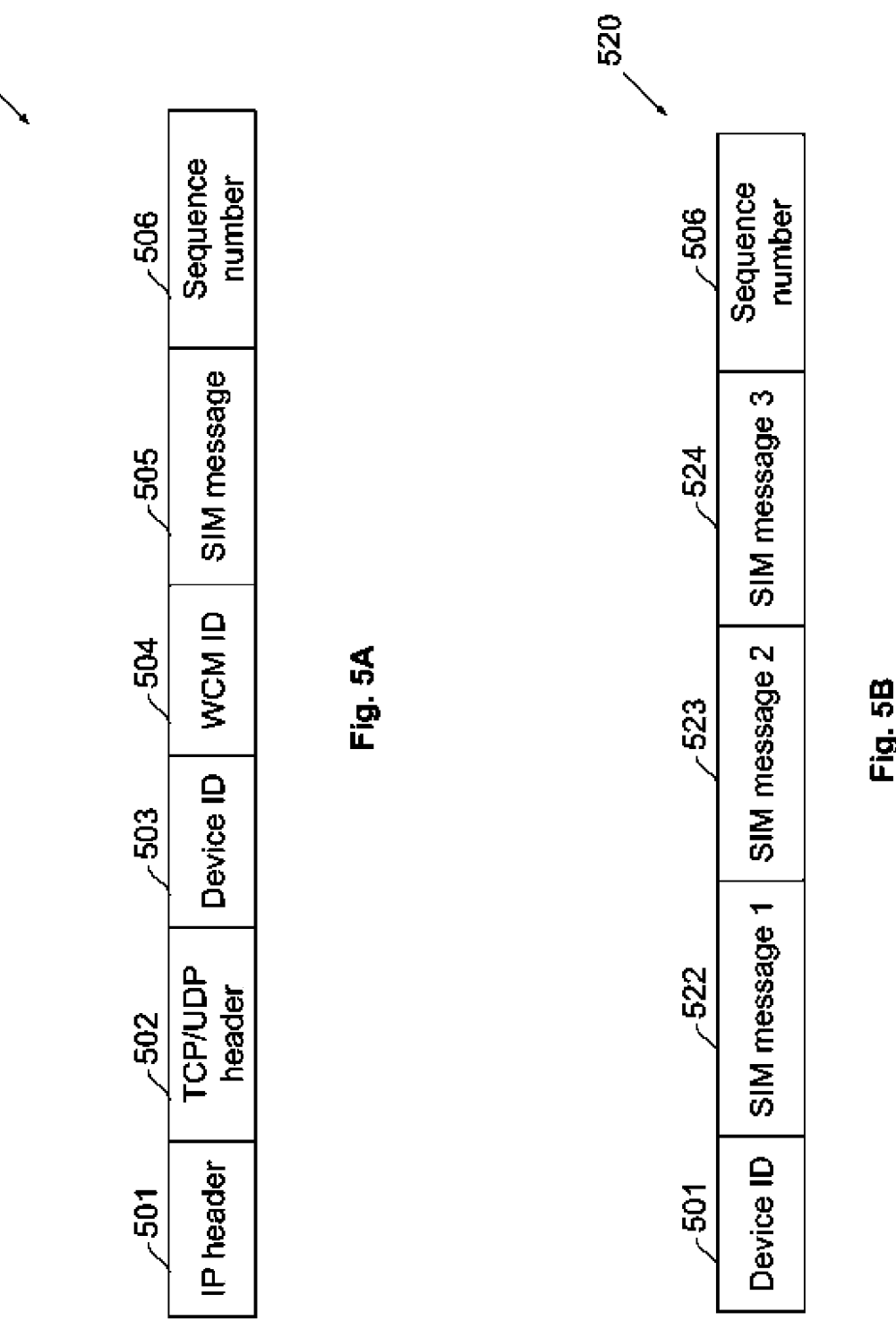
FIG. 5A illustrates a structure of an IP packet according to various embodiments of the present disclosure.
FIG. 5B illustrates a structure of multiple requests and/or responses included in an IP packet according to various embodiments of the present disclosure.

FIG. 5A illustrates a structure of an IP packet, such as IP packet 500, according to various embodiments of the present disclosure. IP packet 500 is a sample of a request or a response described herein. The connections described herein may be implemented using a connection-oriented protocol, such as TCP. When the connection is established using TCP, IP packet 500 is a TCP packet. Alternatively, the connections described herein may be implemented using a connection-less protocol, such as UDP. When the connection is established using UDP, IP packet 500 is a UDP packet.

The structure of IP packet 500 comprises IP header section 501 that may contain IP addresses, IP version, time-to-live, and other information. The IP addresses are the IP addresses of the cellular router and the SIM station.

The structure of IP packet 500 further comprises header section 502. Header section 502 may be a TCP header section or an UDP header section. When IP packet 500 is a TCP packet, header section 502 may contain the port number of the cellular router, the port number of the SIM station, sequence number, acknowledgment number, TCP data offset, reserved data, control flags, window size TCP checksum, urgent pointer, and mTCP optional data. The port numbers are the port number of the cellular router and the port number of the SIM station. When the IP packet is 500 is a UDP packet, header section 502 contains the port number of the cellular router, the port number of the SIM station, length, and checksum.

The structure of IP packet 500 further comprises device ID section 503 that may contain the serial number of the cellular router and the serial number of the SIM station. The structure of IP packet 500 further comprises wireless communication module ID section 504 that may contain the wireless communication module ID of a wireless communication module of the cellular router. The wireless communication module ID is used to identify a connection through which the IP packet was intended to be transmitted.

The structure of IP packet 500 further comprises SIM message section 505 that may contain one or more authentication requests, and/or one or more authentication responses for one or more SIM cards housed in the SIM station. The structure of IP packet 500 further comprises sequence number section 506 that may contain a sequence number to reorder the IP packets at the cellular router or the SIM station when receiving the IP packets.

When there are NATs in the interconnected networks between the cellular router and the SIM station, both the cellular router and the SIM station maintain a respective NAT table for transmitting the IP packets to each other.

When the cellular router 110 sends a request to the SIM station through the connections, the SIM station records each of the wireless communication module IDs with a respective connection in a table. The table may be stored in a storage medium, such as secondary storage 325 of the SIM station. The SIM station then follows the table of wireless communication module IDs and respective connections to send responses through a connection to the cellular router.

There are, for example, five connections established using five respective wireless communication modules of the cellular router. The five connections are a first connection, a second connection, a third connection, a fourth connection, and a fifth connection. These five respective wireless communication modules' IDs are "A", "B", "C", "D", and "E". There is no limitation that the wireless communication modules IDs of the wireless communication modules should be limited to "A", "B", "C", "D", and "E". The wireless communication modules IDs disclosed herein are for illustrative purposes only. In one variant, the wireless communication module IDs may be integers. Also there is no limitation that the table should only include connection name and wireless communication module ID information. In one variant, the table presented below may also include other associated information that may be required to perform the exemplary embodiments disclosed in the present invention. The other associated information to be stored in the table may be set by default by the manufacturer, or by a user or an administrator of the SIM station or the cellular router. A sample table is given below for illustration purposes only:

| Connection Name | Wireless Communication Module ID |
|---|---|
| First connection | A |
| Second connection | B |
| Third connection | C |
| Fourth connection | D |
| Fifth connection | E |

In an exemplary embodiment according to the above mentioned table, when the cellular router sends a request to the SIM station through the first connection, the request includes wireless communication module ID "A". After receiving the request, the SIM station detects wireless communication module ID "A" from the request. The SIM station retrieves the response from a SIM card by taking into account wireless communication module ID "A". The SIM station then sends the response to the cellular router through any of the connections with wireless communication module ID "A". The cellular router then detects that the response is a response to the request intended for receiving through the first connection.

In one variant, only one connection may be used between the cellular router and the SIM station to transmit the requests and responses. All other connections are not in use between the cellular router and the SIM station. Any wireless communication module ID may not be transmitted with the requests and responses. As only one connection is used in this variant, the cellular router and the SIM station may identify the requests and responses without the wireless communication module ID. When this one connection fails and stops transmitting the requests and responses, then another connection is started to be used for transmitting the requests and responses. Any wireless communication module ID may not be included in the requests and responses when transmitting through another connection.

IP packet 500 may be an encapsulated packet encapsulated by the cellular router when sending as a request to the SIM station. After receiving the encapsulated packet as a request, the SIM station decapsulates the encapsulated packet. After decapsulating the encapsulated packet, the SIM station determines one or more authentication requests from SIM message section 505 for respective SIM cards. The SIM station further identifies the wireless communication module ID, and maintains a table for the wireless communication module ID and respective connection. The SIM station then retrieves one or more authentication responses from respective SIM cards to encapsulate in an encapsulated packet in SIM message section 505 as a response to the request. The encapsulated packet encapsulated by the SIM station follows the structure of IP packet 500, and is the response to the request.

The SIM station sends the encapsulated packet to the cellular router as a response to the request. After receiving the encapsulated packet, the cellular router decapsulates the encapsulated packet to determine one or more authentication responses.

It should be noted that the elements contained in IP header section 501, TCP/UDP header section 502, device ID section 503, wireless communication module ID section 504, and sequence number section 506 should be encapsulated and decapsulated along with the elements contained in SIM message section 505 in respective IP packets by the cellular router and the SIM station.

Cellular router 110 and SIM station 120 of FIG. 1A, and cellular router 150 and SIM station 170 of FIG. 1B uses the structure of IP packet 500 to send and receive requests and responses.

FIG. 5B illustrates structure 520 of multiple requests and/or responses included in an IP packet, such as IP packet 500, according to various embodiments of the present disclosure. FIG. 5B should be viewed in conjunction with FIG. 5A for a better understanding of the embodiments.

In comparison to FIG. 5A, FIG. 5B illustrates more than one SIM message section in structure 520. Additionally, each of SIM message 1 section 522, SIM message 2 section 523, and SIM message 3 section 524 may contain a respective wireless communication module ID, and authentication requests and/or authentication responses for respective SIM cards. The cellular router may send multiple authentication requests for SIM cards following structure 520 into an IP packet to the SIM station through one connection. The SIM station then detects each of the authentication requests is intended for which SIM card by taking into account the respective wireless communication module IDs. SIM station further sends respective authentication responses into another IP packet to the cellular through one connection. The cellular router then detects each of the authentication responses is intended for which SIM card by taking into account the respective wireless communication module ID.

Figure 6A:
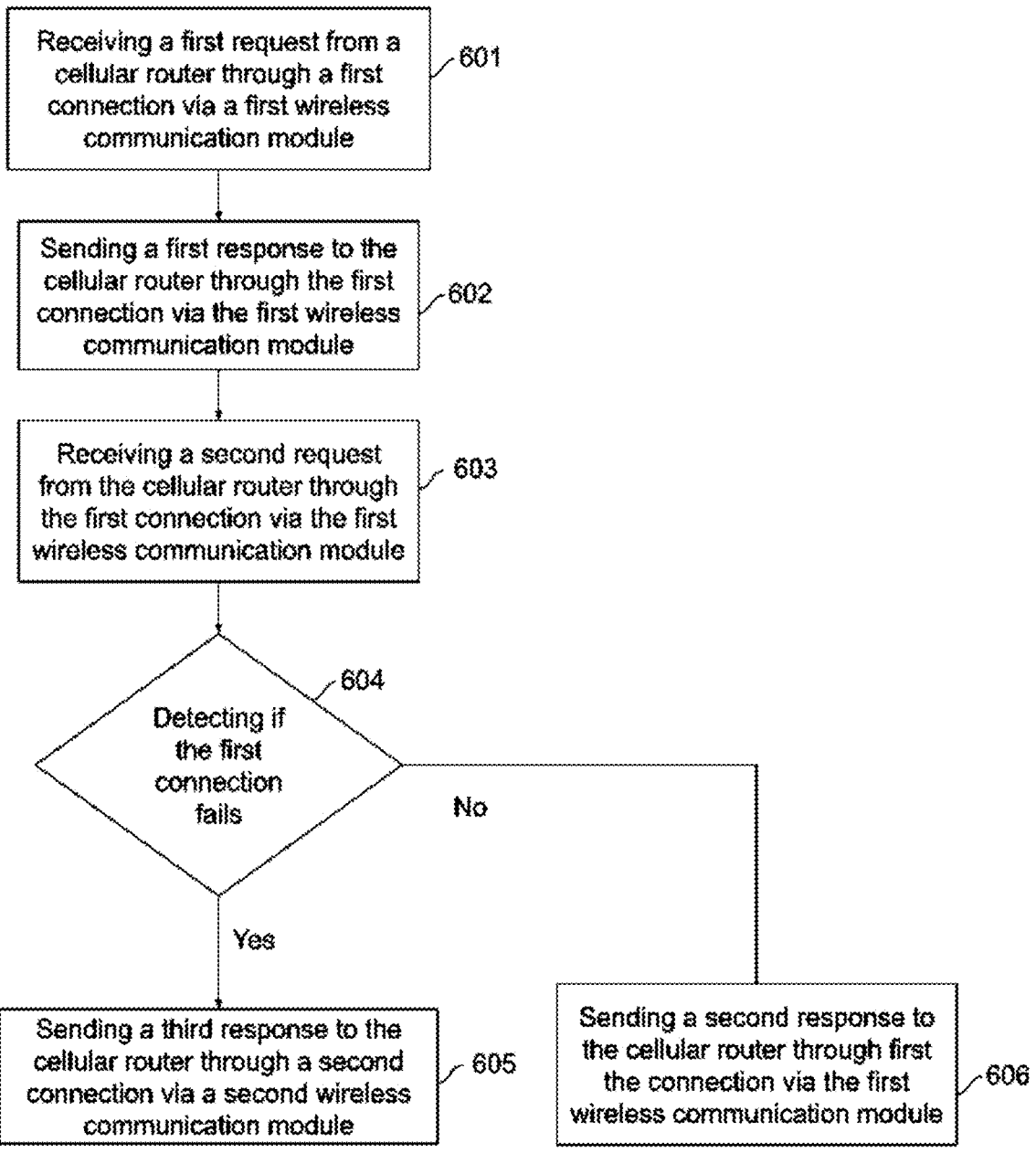
FIG. 6A is a flowchart illustrating processes performed at a SIM station of the present disclosure.

FIG. 6A is a flowchart illustrating methods performed at a SIM station of the present disclosure. FIG. 6A should be viewed in conjunction with FIGS. 1A and 4A for a better understanding of the embodiments.

In process 601, SIM station 120 receives a first request, such as request 410, from cellular router 110 through a first connection via wireless communication module 111. In process 602, after receiving request 410, SIM station 120 sends a first response, such as response 411, to cellular router 110 through the first connection via wireless communication module 111.

In process 603, SIM station 120 receives a second request, such as request 412, from cellular router 110 through the first connection via wireless communication module 111. In process 604, after receiving request 412, SIM station 120 detects whether the first connection fails or not. SIM station 120 detects that the first connection has failed when a second response, such as response 413, is not able to be sent through the first connection via wireless communication module 111.

It should be noted that a person having ordinary skill in the art would appreciate that SIM station 120 may detect whether the first connection has failed or not even after receiving request 410 or any other request through the first connection.

In process 605, if SIM station 120 detects that the first connection has failed in process 604, SIM station 120 sends a third response, such as response 414, through a second connection via wireless communication module 112. Herein, response 414 is created by SIM station 120 with the contents of response 413, including wireless communication module ID of wireless communication module 111 before sending to cellular router 110.

In process 606, if the first connection has not failed in process 604, SIM station 120 sends response 413 to cellular router 110 through the first connection via wireless communication module 111.

Figure 6B:
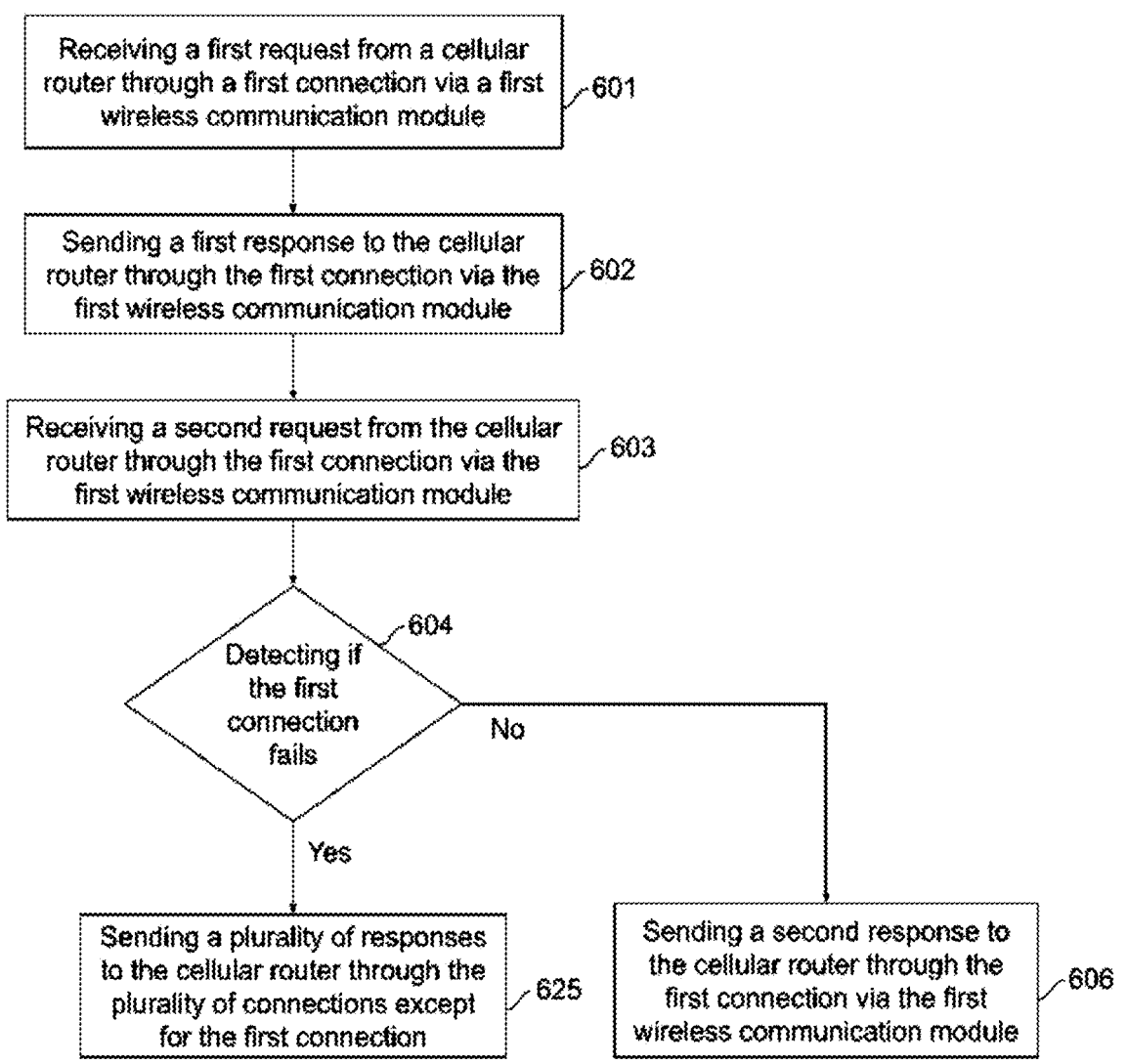
FIG. 6B is a flowchart illustrating processes performed at a SIM station of the present disclosure.

FIG. 6B is a flowchart illustrating methods performed at a SIM station of the present disclosure. FIG. 6B should be viewed in conjunction with FIGS. 1B, 4B, and 6A for a better understanding of the embodiments.

In comparison to FIG. 6A, FIG. 6B illustrates that a cellular router comprises a plurality of wireless communication modules to establish a plurality of connections with a SIM station. For example, cellular router 150 comprises five wireless communication modules 151, 152, 153, 154, and 155 to establish respective connections, such as a first connection, a second connection, a third connection, a fourth connection, and a fifth connection, with SIM station 170.

When SIM station 150 detects that the first connection has failed in process 604, SIM station 150 then sends a plurality of responses through the plurality of connections except for the first connection. The plurality of responses is, for example, response 465, response 466, response 467, and response 468. These four responses are created by SIM station 170 with the contents of a response, such as response 464. Response 644 has failed to be sent through the first connection via wireless communication module 151. Each of response 465, response 466, response 467, and response 468 further comprise the wireless communication module ID of wireless communication module 151.

In one variant, SIM station 150 determines the number of available connections. The available connections are the second connection, the third connection, the fourth connection, and the fifth connection. Thus, the number of available connections is four. SIM station 170 then creates four responses, such as response 465, response 466, response 467, and response 468.

In process 625, SIM station 170 sends response 465, response 466, response 467, and response 468 through the fifth connection, the fourth connection, the third connection, and the second connection, respectively.

FIG. 6C is a flowchart illustrating methods performed at a SIM station of the present disclosure. FIG. 6C should be viewed in conjunction with FIGS. 1B and 4C for a better understanding of the embodiments.

In process 641, SIM station 170 receives a plurality of requests from cellular router 150 through a plurality of connections via respective wireless communications modules. SIM station 170 receives, for example, five requests, such as, request 481, request 482, request 483, request 484, and request 486, through five respective connections. The five connections are a first connection, a second connection, a third connection, a fourth connection, and a fifth connection established using five respective wireless communication modules. The five wireless communication modules are wireless communication modules 151, 152, 153, 154, and 155.

In process 642, SIM station 170 sends a plurality of responses to cellular router 150 through respective connections via respective wireless communication modules. SIM station 170 sends, for example, five responses, such as response 486, response 487, response 488, response 489, and response 490 after receiving request 481, request 482, request 483, request 484, and request 486, respectively.

A response is sent through the connection through which a corresponding request is received. For example, request 481 is received through the first connection via wireless communication module 151. Herein, the response for request 481 is response 486. SIM station 170 sends response 486 to cellular router 150 through the first connection via wireless communication module 151. Accordingly, response 487, response 488, response 489, and response 490 are sent to cellular router 150 through the second connection, the third connection, the fourth connection, and the fifth connection, respectively.

In process 643, SIM station 170 detects if any of the connections have failed. In comparison to process 604 of FIG. 6A, one or more of the first connection, the second connection, the third connection, the fourth connection, and the fifth connection may fail, and stop transmitting the responses. Thus, one or more of the corresponding responses failed to be sent to cellular router 150 through one or more respective connections. SIM station 170, for example, detects a connection, such as the first connection, that has failed. Thus, a response has failed to be sent through the first connection to cellular router 150. SIM station 170 creates a new response with the contents of the response that has failed to be sent. The new response comprises a wireless communication module ID of wireless communication module 151 and is sent through one or all of the second connection, the third connection, the fourth connection, and the fifth connection.

SIM station 170 follows the rank of the connections when sending the new response through a connection. SIM station 170 selects the connection with the highest rank and sends the new response through the selected connection.

In one variant, SIM station 170 creates a new plurality of responses when sending the response through all of the second connection, the third connection, the fourth connection, and the fifth connection. SIM station 170 follows the techniques described in process 625 when using all of the second connection, the third connection, the fourth connection, and the fifth connection to send the new plurality of responses.

There is no limitation on the number of connections that are detected as failed in process 643. The number of the failed connections may be more than one connection, and any of the first connection, the second connection, the third connection, the fourth connection, and the fifth connection may be failed. It should be noted that for the implementation of the present disclosure, at least two of the first connection, the second connection, the third connection, the fourth connection, and the fifth connection should be maintained at the same time between cellular router 150 and SIM station 170.

If none of the first connection, the second connection, the third connection, the fourth connection, and the fifth connection has failed in process 643, SIM station 170 then keeps receiving and sending, further requests and further responses through all these connections in process 645.

FIGS. 6A, 6B, and 6C are the different variations of the functions of a SIM station performed in accordance with FIGS. 2A and 2B.

FIG. 7A is a flowchart illustrating methods performed at a cellular router of the present disclosure. FIG. 7A should be viewed in conjunction with FIGS. 1A, 4A, and 6A for a better understanding of the embodiments.

In process 701, cellular router 110 sends a first request, such as request 410, to SIM station 120 through a first connection via wireless communication module 111.

In process 702, cellular router 110 receives a first response, such as response 411, from SIM station 120 through the first connection via wireless communication module 111.

In process 703, cellular router 110 sends a second request, such as request 412, to SIM station 120 through the first connection via wireless communication module 111.

In process 704, cellular router 110 receives a second response, such as response 413, from SIM station 120 through the first connection via wireless communication module 111. Response 413 is received by cellular router 110 if the first connection is not failed in process 604 of FIG. 6A.

Alternatively, cellular router 110 receives a third response, such as response 414, through a second connection via wireless communication module 112. Response 414 is received by cellular router 110 if the first connection has failed in v 604 of FIG. 6A. As response 414 includes the wireless communication module ID of wireless communication module 111, cellular router 110 identifies the wireless communication module ID of wireless communication module 111 from response 414. Cellular router 110 then detects that the contents included in response 414 are intended for receiving using response 413 through the first connection via wireless communication module 111.

Figure 7B:
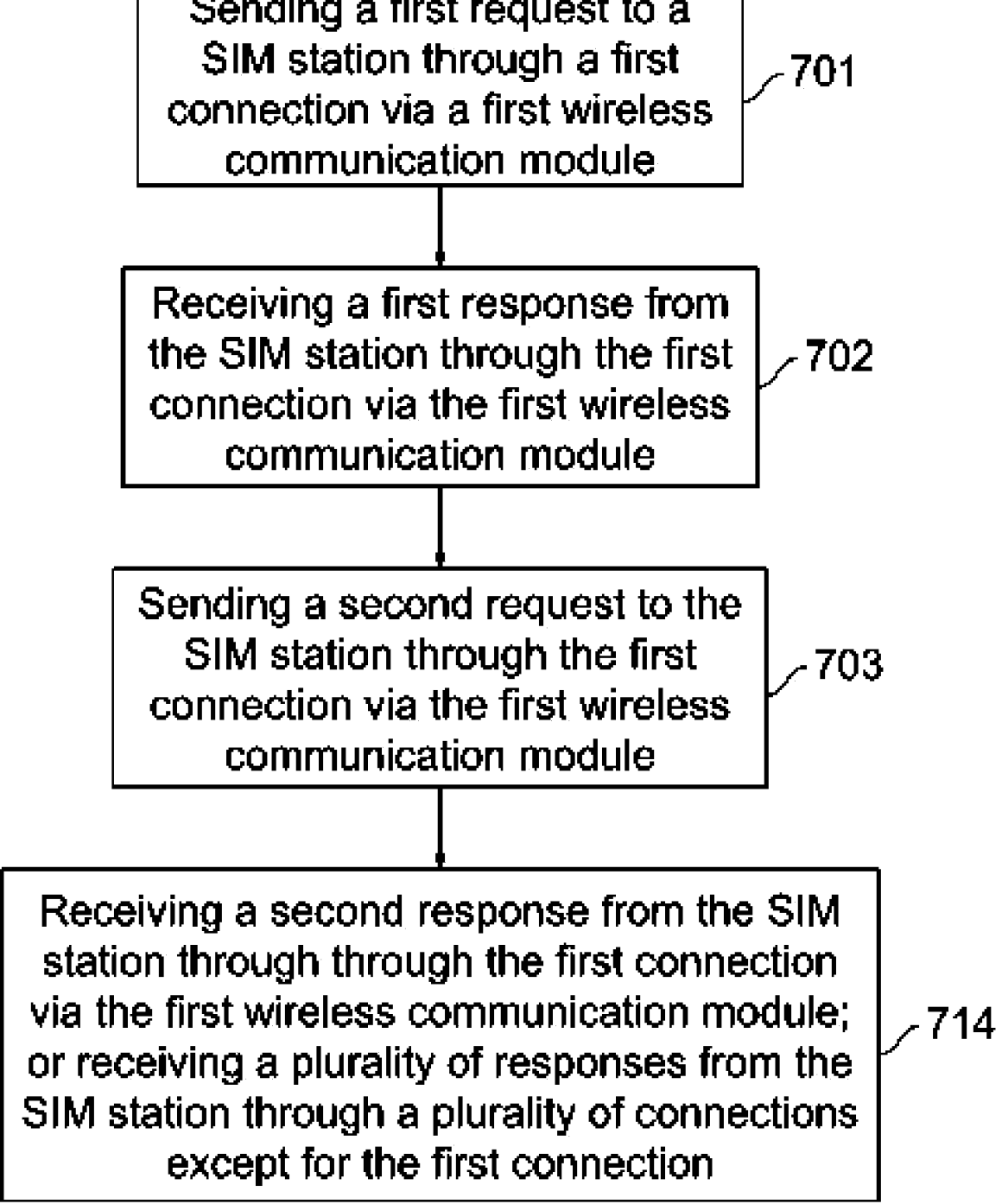
FIG. 7B is a flowchart illustrating processes performed at a cellular router of the present disclosure.

FIG. 7B is a flowchart illustrating methods performed at a cellular router of the present disclosure. FIG. 7B should be viewed in conjunction with FIGS. 1B, 4B, 6B, and 7A for a better understanding of the embodiments.

In comparison to FIG. 7A, FIG. 7B illustrates that a cellular router comprises a plurality of wireless communication modules to establish a plurality of connections with a SIM station. For example, cellular router 150 comprises five wireless communication modules 151, 152, 153, 154, and 155 to establish respective connections, such as a first connection, a second connection, a third connection, a fourth connection, and a fifth connection, with SIM station 170.

In process 714, cellular router 150 receives a second response, response 464, from SIM station 170 through the first connection via wireless communication module 151. Response 464 is received by cellular router 150 when the first connection is not failed in process 604.

Alternatively, cellular router 150 receives a plurality of responses from SIM station 170 through a plurality of connections except for the first connection. The plurality of responses is received by cellular router 150 when the first connection fails and stops transmitting the responses in process 604. For example, there are four responses, such as response 465, response 466, response 467, and response 468, received by cellular router 150 through four respective connections, such as the fifth connection, the fourth connection, the third connection, and the second connection, via four respective wireless communication modules, such as wireless communication modules 155, 154, 153, and 152. Each of response 465, response 466, response 467, and response 468 comprises the contents of response 464, including the wireless communication module ID of wireless communication module 151.

Cellular router 150 may receive more than one of response 465, response 466, response 467, and response 468 at the same time. Cellular router 150 then selects one of the responses that are received at the same time. Cellular router 150 further selects the connection through which the selected response is received. The connection may be selected by cellular router 150 when cellular router 150 performs monitoring and prioritizing the connections following the techniques described in process 211 of FIG. 2B. The connection selected by cellular router 150 is with the highest rank among all the connections.

In one variant, cellular router 150 selects the response that is received at first in the sequence and then selects the connection through which the first response is received. For example, response 468 is the first response among response 465, response 466, response 467, and response 468 received by cellular router 150. Cellular router 150 then selects the second connection as response 468 is received through the second connection. Cellular router 150 then uses the second connection to send further requests and receive further responses with SIM station 170.

In another variant, cellular router 150 may receive only one of response 465, response 466, response 467, and response 468. If cellular router 150 receives only one of response 465, response 466, response 467, and response 468, cellular router 150 then selects the connection through which the only one response is received. Cellular router 150 then starts using the selected connection to send further requests and to receive further responses with SIM station 150.

FIG. 7C is a flowchart illustrating methods performed at a cellular router of the present disclosure. FIG. 7B should be viewed in conjunction with FIGS. 1B, 4C, and 6C for a better understanding of the embodiments.

In process 720, cellular router 150 sends a plurality of requests to SIM station 170 through a plurality of connection, respectively, via a plurality of wireless communication modules, respectively. For example, cellular router 150 sends five requests, such as request 481, request 482, request 483, request 484, and request 485. These five requests are sent through five respective connections, such as a first connection, a second connection, a third connection, a fourth connection, and a fifth connection, via respective five wireless communication modules, such as wireless communication modules 151, 152, 153, 154, and 155.

In process 721, cellular router 150 receives a plurality of responses from SIM station 170 through a plurality of connection, respectively, via a plurality of wireless communication modules. For example, cellular router 150 receives five responses, such as response 486, response 487, response 488, response 489, and response 490. These responses are received through the first connection, the second connection, the third connection, the fourth connection, and the fifth connection, respectively, via wireless communication modules 151, 152, 153, 154, and 155, respectively. If one or more of the first connection, the second connection, the third connection, the fourth connection, and the fifth connection are failed and stopped transmitting the responses, cellular router 150 receives one or more responses through different one or more connections. These one or more responses are created by SIM station 170. The created one or more responses comprise the contents of the one or more responses that are failed to be sent through one or more connections due to the failure. The created one or more responses further comprise one or more wireless communication module IDs of respective wireless communication modules. After receiving the created one or more responses, cellular router 150 identifies for which the created one or more responses are intended by using the wireless communication module ID.

FIGS. 7A, 7B, and 7C are the different variations of the functions of a cellular router performed in accordance with FIGS. 2A and 2B.

Figure 8:
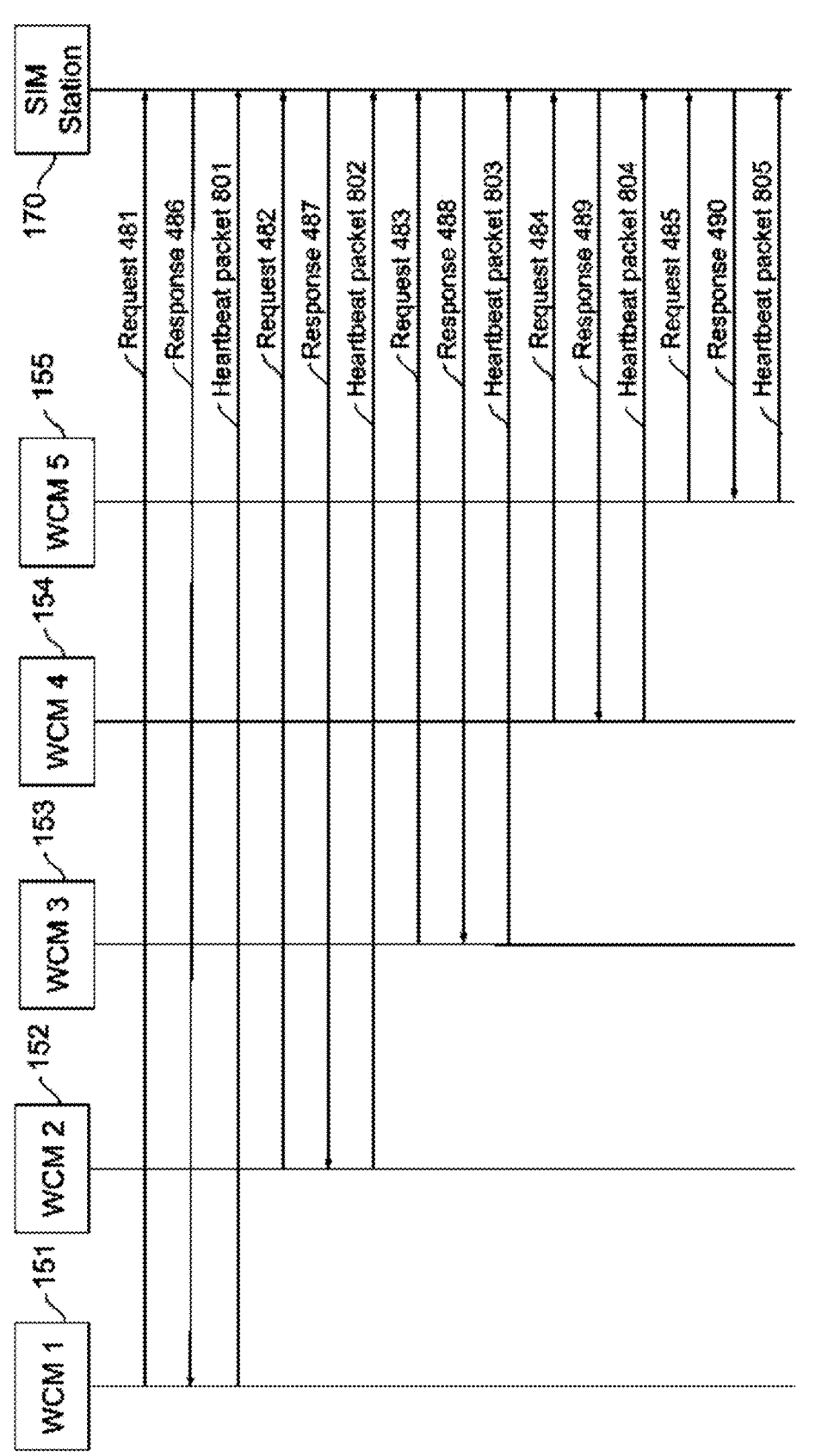
FIG. 8 illustrates how each heartbeat packet is kept transmitting through each connection between a cellular router and a SIM station to maintain a plurality of connections.

FIG. 8 is a diagram that illustrates how heartbeat packets kept transmitting through each connection between cellular router 150 and SIM station 170 to maintain a plurality of connections. The heartbeat packets are preferred to be sent using UDP protocol. However, other communication protocols, such as TCP protocol, may also be used. In one variant, a heartbeat packet may include a request. In another variant, a request may include a heartbeat packet. In another variant, only the heartbeat packets are transmitted without the requests when the connection is not in use. FIG. 8 should be viewed in conjunction with FIGS. 1B and 4C for a better understanding of the embodiments.

Cellular router 150 sends a plurality of heartbeat packets through the plurality of connections to SIM station 170 to maintain the plurality of connections. For example, cellular router 150 sends five heartbeat packets, such as heartbeat packet 801, heartbeat packet 802, heartbeat packet 803, heartbeat packet 804, and heartbeat packet 805, through the first connection, the second connection, the third connection, the fourth connection, and the fifth connection, respectively. Cellular router 150 sends further heartbeat packets through each of the connections periodically. Cellular router 110 and SIM station 120 are also applicable for FIG. 8.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components, and the methods described may include more, fewer, or other steps. Additionally, steps may be performed in any suitable order.

The invention claimed is:

1. A method for performing wireless communication between a cellular router and a subscriber identification module (SIM) station, the method comprising:
    (a) at the cellular router, establishing a plurality of connections with a plurality of SIM cards of the SIM station by using a plurality of wireless communication modules (WCMs) of the cellular router;
    (b) at the cellular router, starting to send and to receive IP packets with the SIM station through one of the plurality of connections;
    (c) when a first connection is being used to send requests and to receive one or more of the IP packets:
        (i) at the SIM station, detecting whether the first connection has failed or not; wherein the first connection is detected as failed when the one or more of the IP packets is stopped from being sent through the first connection;
        (ii) at the SIM station, retrying to send the one or more of the IP packets through the first connection during a period of time when the first connection has failed;

(iii) at the SIM station, sending and receiving the IP packets through a second connection when the first connection has failed and the period of time has elapsed;
        (iv) at the cellular router, re-establishing the first connection with the SIM station;
    (d) when the second connection is being used to send and receive the one or more of the IP packets:
        (i) at the SIM station, detecting whether the second connection has failed or not; wherein the second connection is detected as failed when the one or more of the IP packets is stopped from being sent through the second connection;
        (ii) at the SIM station, retrying to send the one or more of the IP packets through the second connection during the period of time when the second connection has failed;
        (iii) at the SIM station, sending and receiving the IP packets through a third first connection when the second connection has failed and the period of time has elapsed;
        (iv) at the cellular router, re-establishing the second connection with the SIM station;
    wherein:
        the first connection is one of the plurality of connections with best performance;
        the second connection is one of the plurality of connections, excluding the first connection, with best performance;
        the third connection is one of the plurality of connections, excluding the first connection and the second connection, with best performance;
        each of the IP packets comprises a plurality of message sections;
        each of the message sections comprises a WCM ID and one of: an authentication request and an authentication response;
        the WCM ID corresponds to a wireless communication module (WCM) of the plurality of WCMs and a SIM card of the plurality of SIM cards.

2. The method of claim 1, further comprising:
    after step (b) and before step (c), at the SIM station, determining the performance of the plurality of connections based on a criterion.

3. The method of claim 2, wherein the criterion is bandwidth.

4. The method of claim 2, wherein the criterion is latency.

5. The method of claim 1, wherein the SIM station comprises at least one wide area network (WAN) interface to establish the plurality of connections with the cellular router using the plurality of WCMs.

6. The method of claim 1, wherein the one or more of the authentication responses is stopped from being sent via the IP packets through the one of the plurality of connections if a respective SIM card is out of network.

7. The method of claim 1, wherein:
    each of the IP packets sent by the SIM station is extracted by the cellular router to identify the WCM ID in each of the plurality of message sections; and
    the authentication response in each of the plurality of message sections is forwarded by the wireless communication module of the plurality of wireless communication modules corresponding to the WCM ID.

8. The method of claim 1, wherein;
    each of the IP packets sent by the cellular router is extracted by the SIM station to identify the WCM ID in each of the plurality of message sections; and the authentication request in each of the plurality of message sections is sent to the SIM card of the plurality of SIM cards corresponding to the WCM ID.

9. The method of claim 1, further comprising:

at step (c), at the SIM station, continuing to use the first connection with the cellular router when the first connection is not detected as failed; and at step (d), at the SIM station, continuing to use the second connection with the cellular router when the second connection is not detected as failed.

10. The method of claim 1, further comprising:

at the cellular router, sending a plurality of heartbeat packets to the SIM station periodically through each of the plurality of connections.

11. A system for performing wireless communication between a cellular router and a subscriber identification module (SIM) station, comprising:

the cellular router; and the SIM station;

wherein the cellular router comprises:

at least one first processing unit;

at least one first non-transitory computer readable storage medium;

a plurality of wireless communication modules;

wherein the SIM station comprises:

at least one second processing unit;

at least one second non-transitory computer readable storage medium;

at least one wide area network (WAN) interface;

wherein the at least one first non-transitory computer readable storage medium stores program instructions executable by the at least one first processing unit for:

(a) establishing a plurality of connections with a plurality of SIM cards of the SIM station by using, a plurality of wireless communication modules (WCMs) of the cellular router;

(b) starting to send and to receive IP packets with the SIM station through one of the plurality of connections;

(c) when a first connection is being used to send and receive one or more of the IP packets and the first connection has failed, re-establishing the first connection with the SIM station;

(d) when a second connection is being used to send and receive the one or more of the IP packets and the second connection has failed, re-establishing the second connection with the SIM station;

wherein the at least one second non-transitory computer readable storage medium stores program instructions executable by the at least one second processing unit for:

(e) when the first connection is being used:

(i) detecting whether the first connection has failed or not; wherein the first connection is detected as failed when the one or more of the IP packets is stopped from being sent through the first connection;

(ii) retrying to send the one or more of the IP packets through the first connection during a period of time when the first connection has failed;

iii) sending and receiving the IP packets through the second connection when the first connection has failed and the period of time has elapsed;

(f) when the second connection is being used:

(i) detecting whether the second connection has failed or not; wherein the second connection is detected as failed when the one or more of the IP packets is stopped from being sent through the second connection;

(ii) retrying to send the one or more of the IP packets through the second connection during the period of time when the second connection has failed;

(iii) sending and receiving the IP packets through a third connection when the second connection has failed and the period of time has elapsed;

wherein:

the first connection is one of the plurality of connections with best performance;

the second connection is one of the plurality of connections, excluding the first connection, with best performance;

the third connection is one of the plurality of connections, excluding the first connection and the second connection, with best performance;

each of the IP packets comprises a plurality of message sections;

each of the message sections comprises a WCM ID and one of: an authentication request and an authentication response;

the WCM ID corresponds to a wireless communication module (WCM) of the plurality of WCMs and a SIM card of the plurality of SIM cards.

12. The system of claim 11, wherein the at least one second non-transitory computer readable storage medium further stores program instructions executable by the at least one second processing unit for:

before step (e), determining the performance of the plurality of connections based on a criterion.

13. The system of claim 12, wherein the criterion is bandwidth.

14. The system of claim 12, wherein the criterion is latency.

15. The system of claim 11, wherein the SIM station establishes the plurality of connections through the at least one WAN interface with the cellular router using the plurality of wireless communication modules.

16. The system of claim 11, wherein the one or more of the authentication responses is stopped from being sent via the IP packets through the one of the plurality of connections if a respective SIM card is out of network.

17. The system of claim 11, wherein:

each of the IP packets sent by the SIM station is extracted by the cellular router to identify the WCM ID in each of the plurality of message sections; and the authentication response in each of the plurality of message sections is forwarded by the wireless communication module of the plurality of wireless communication modules corresponding to the WCM ID.

18. The system of claim 11, wherein:

each of the IP packets sent by the cellular router is extracted by the SIM station to identify the WCM ID in each of the plurality of message sections; and the authentication request in each of the plurality of message sections is sent to the SIM card of the plurality of SIM cards corresponding to the WCM ID.

19. The system of claim 11, wherein the at least one second non-transitory computer readable storage medium further stores program instructions executable by the at least one second processing unit for:

at step (e), continuing to use the first connection with the cellular router when the first connection is not detected as failed; and at step (f), continuing to use the second connection with the cellular router when the second connection is not detected as failed.

20. The system of claim 11, wherein the at least one first non-transitory computer readable storage medium further stores program instructions executable by the at least one second processing unit for:

sending a plurality of heartbeat packets to the SIM station periodically through each of the plurality of connections.

\* \* \* \* \*